United States Patent
Scicluna et al.

(10) Patent No.: US 10,217,069 B2
(45) Date of Patent: Feb. 26, 2019

(54) SYSTEMS AND METHODS FOR VEHICLE RESOURCE MANAGEMENT

(71) Applicant: Addison Lee Limited, London (GB)

(72) Inventors: Larry Scicluna, Rochester (GB); Andrey Glaschenko, Samara (RU)

(73) Assignee: Addison Lee Limited, London (GB)

( * ) Notice: Subject to any disclaimer, the term of this patent is extended or adjusted under 35 U.S.C. 154(b) by 0 days.

(21) Appl. No.: 15/051,956

(22) Filed: Feb. 24, 2016

(65) Prior Publication Data

US 2016/0247109 A1    Aug. 25, 2016

(30) Foreign Application Priority Data

Feb. 24, 2015 (GB) .................................. 1503082.8

(51) Int. Cl.
G06Q 10/06 (2012.01)
G08G 1/00 (2006.01)
G06Q 50/10 (2012.01)
G06Q 50/30 (2012.01)

(52) U.S. Cl.
CPC ....... *G06Q 10/06315* (2013.01); *G06Q 50/10* (2013.01); *G06Q 50/30* (2013.01); *G08G 1/202* (2013.01)

(58) Field of Classification Search
None
See application file for complete search history.

(56) References Cited

U.S. PATENT DOCUMENTS

| 9,805,431 B2 | 10/2017 | Scicluna |
| 2002/0034292 A1 | 3/2002 | Tuoriniemi |
| 2003/0065556 A1 | 4/2003 | Takanashi et al. |
| 2004/0093280 A1 | 5/2004 | Yamaguchi |
| 2004/0236501 A1 | 11/2004 | Hirose et al. |
| 2004/0267449 A1 | 12/2004 | Adamczyk |
| 2006/0059023 A1 | 3/2006 | Mashinsky |
| 2007/0230374 A1 | 10/2007 | Altberg |
| 2008/0114629 A1 | 5/2008 | Pavlov |

(Continued)

FOREIGN PATENT DOCUMENTS

| CN | 102831769 | 12/2012 |
| JP | 2007334472 | 12/2007 |

(Continued)

OTHER PUBLICATIONS

T Andersson and P Varbrand, "Decision support tools for ambulance dispatch and relocation," 2007, Journal of the Operational Research Society, vol. 58, pp. 195-201 (Year: 2007).*

(Continued)

*Primary Examiner* — Thomas L Mansfield
*Assistant Examiner* — Amanda Gurski
(74) *Attorney, Agent, or Firm* — Michael D. Downs; Fincham Downs LLC

(57) ABSTRACT

Systems, methods, apparatus, and computer-readable media provide for allocating vehicle resources to future vehicle requirements. In some embodiments, allocating a vehicle resource to a vehicle requirement may be based on an iterative analysis of candidate vehicle resources using one or more of: a suitability of a candidate vehicle resource to fullfill the vehicle requirement, a journey time from a vehicle location to a start location, and/or a start time for the vehicle requirement.

26 Claims, 9 Drawing Sheets

(56) References Cited

U.S. PATENT DOCUMENTS

| | | | |
|---|---|---|---|
| 2008/0125968 | A1 | 5/2008 | Bradicich et al. |
| 2008/0195428 | A1 | 8/2008 | O'Sullivan |
| 2008/0312822 | A1 | 12/2008 | Lucas et al. |
| 2009/0172009 | A1 | 7/2009 | Schmith et al. |
| 2009/0204600 | A1* | 8/2009 | Kalik .................. G01C 21/30 |
| 2009/0313077 | A1 | 12/2009 | Wheeler |
| 2011/0065421 | A1 | 3/2011 | Wu |
| 2011/0099040 | A1 | 4/2011 | Felt et al. |
| 2011/0313804 | A1* | 12/2011 | Camp .................. G06Q 10/02 |
| | | | 705/7.13 |
| 2012/0041675 | A1* | 2/2012 | Juliver .................. G06Q 10/08 |
| | | | 701/465 |
| 2012/0232943 | A1 | 9/2012 | Myr |
| 2012/0239452 | A1 | 9/2012 | Trivedi et al. |
| 2013/0218647 | A1 | 8/2013 | Kroll et al. |
| 2013/0246207 | A1 | 9/2013 | Novak |
| 2013/0297463 | A1 | 11/2013 | Garber |
| 2014/0026065 | A1 | 1/2014 | Wang |
| 2014/0108201 | A1 | 4/2014 | Frechette |
| 2014/0129951 | A1 | 5/2014 | Amin |
| 2014/0180741 | A1 | 6/2014 | Franke |
| 2014/0309815 | A1 | 10/2014 | Ricci |
| 2015/0032485 | A1 | 1/2015 | Nelson |
| 2015/0046083 | A1 | 2/2015 | Maitra |
| 2015/0161564 | A1 | 6/2015 | Sweeney |
| 2015/0161752 | A1* | 6/2015 | Barreto .................. G06Q 50/30 |
| | | | 705/7.15 |
| 2015/0223024 | A1 | 8/2015 | Abuodeh |
| 2016/0132792 | A1 | 5/2016 | Rosnow |
| 2016/0247109 | A1 | 8/2016 | Scicluna et al. |
| 2016/0248914 | A1 | 8/2016 | Lacey |
| 2016/0342946 | A1 | 11/2016 | Herraiz |
| 2016/0364812 | A1 | 12/2016 | Cao |
| 2016/0364823 | A1 | 12/2016 | Cao |
| 2017/0160092 | A1 | 6/2017 | Botea |
| 2018/0075566 | A1 | 3/2018 | Lacey |
| 2018/0150772 | A1 | 5/2018 | Ryan et al. |

FOREIGN PATENT DOCUMENTS

| | | |
|---|---|---|
| JP | 2010134849 | 6/2010 |
| JP | 2012190237 | 10/2012 |
| JP | 2013134641 | 7/2013 |
| KR | 20120002764 | 1/2012 |
| KR | 10-2013-0082567 | 7/2013 |
| WO | WO2004047046 | 6/2004 |

OTHER PUBLICATIONS

Written Opinion for PCT/IB2016/051012 filed Feb. 24, 2106, dated May 25, 2016, 11 pages.
International Search Report for PCT/IB2016/051012 filed Feb. 24, 2106, dated May 25, 2016, 3 pages.
Website: "https://www.youtube.com/watch?v=T3qGB_eSAFs" Sherlock Taxi—Allocation Demo; published Mar. 28, 2014.
Website: "https://vimeo.com/113022930" Addison Lee Auto Allocator; published Nov. 27, 2014.
Website: "https://www.youtube.com/watch?v=ZVExf-Mz8Mo&t=1s" Addison Lee at Google PinPoint London 2012; published Nov. 12, 2012.
4. "Multi-Agent Real Time Scheduling System for Taxi Companies", Glaschenko et al, AAMAS 2009 • 8th International Conference on Autonomous Agents and Multiagent Systems • May 10-15, 2009 • Budapest, Hungary.
International Search Report and Written Opinion for PCT/IB2016/051006 dated May 31, 2016; 11 pages.
Combined Search and Examination Report for Application No. GB1503084.4 dated Aug. 25, 2015; 6 pages.
English Abstract and Bibliographic Data for CN102831769 (website: http://worldwide.espacenet.com/publicationDetails/biblio?...) download date Mar. 24, 2016; 1 page.
English Abstract and Bibliographic Data for KR20120002764 (website: http://worldwide.espacenet.com/publicationDetails/biblio?CC=KR . . . ) download date Mar. 24, 2016; 1 pages.
Office Action for U.S. Appl. No. 15/051,920 dated Sep. 15, 2016; 7 pps.
Final Office Action for U.S. Appl. No. 15/051,920 dated Mar. 17, 2017; 7 pps.
Office Action for U.S. Appl. No. 15/051,920 dated Aug. 31, 2017; 8 pps.
Office Action for U.S. Appl. No. 15/051,948 dated Aug. 29, 2016; 27 pps.
Final Office Action for U.S. Appl. No. 15/051,948 dated Feb. 23, 2017; 15 pps.
Notice of Allowance for U.S. Appl. No. 15/051,948 dated Jun. 29, 2017; 30 pps.
Written Opinion for PCT/IB2016/051012 filed Feb. 24, 2016, dated May 25, 2016, 11 pages.
"Decision support tools for ambulance dispatch and relocation", T. Andersson et al., Journal of the Operational Research Society, vol. 58, No. 2, Feb. 1, 2007 (Feb. 1, 2007), pp. 195-201.
"Solving the dynamic ambulance relocation and dispatching problem using approximate dynamic programming", Christian Bierwirth et al., European Journal of Operational Research, vol. 219, No. 3, pp. 611-621.
European Examination and Search Report for Application No. EP16754844.5 dated Jun. 29, 2018; 9 pages.
European Examination and Search Report for Application No. EP16754837.9 dated Jun. 29, 2018; 14 pages.

* cited by examiner

SYSTEMS AND METHODS FOR VEHICLE RESOURCE MANAGEMENT

FIELD OF THE INVENTION

The present invention relates to the management of vehicle resources in relation to vehicle requirements, and in particular relates to analysing the suitability of dynamic sets of vehicle resources for future vehicle requirements.

BACKGROUND TO THE INVENTION

In the field of fleet vehicle management (e.g., delivery trucks, private hire vehicles, and taxis), historically vehicles and drivers were allocated to bookings by a human operator, called a controller. The controller would be in contact with the drivers of vehicles of a fleet by voice channels (typically one shared voice channel) of a radio system, through which the controller and the drivers could speak with one another. The controller could ascertain the locations of drivers by requesting the drivers to provide their locations verbally. The controller could also enquire of drivers when they expected to drop passengers and thus become free again for fulfilling a booking. Drivers would be provided with details of bookings allocated to them by the controller verbally through the radio system. Such manual systems are still widely in use.

Some third parties provide automatic allocation of instant bookings but do not provide automatic allocation of advanced bookings or other types of future vehicle requirements. Techniques used in automatic allocation of instant bookings are generally not applicable to automatic allocation of future vehicle requirements.

BRIEF DESCRIPTION OF THE FIGURES

Embodiments of the invention will now be described, by way of example only, with reference to the accompanying drawings, in which.

DETAILED DESCRIPTION OF SOME EMBODIMENTS OF THE INVENTION

Figure 1:
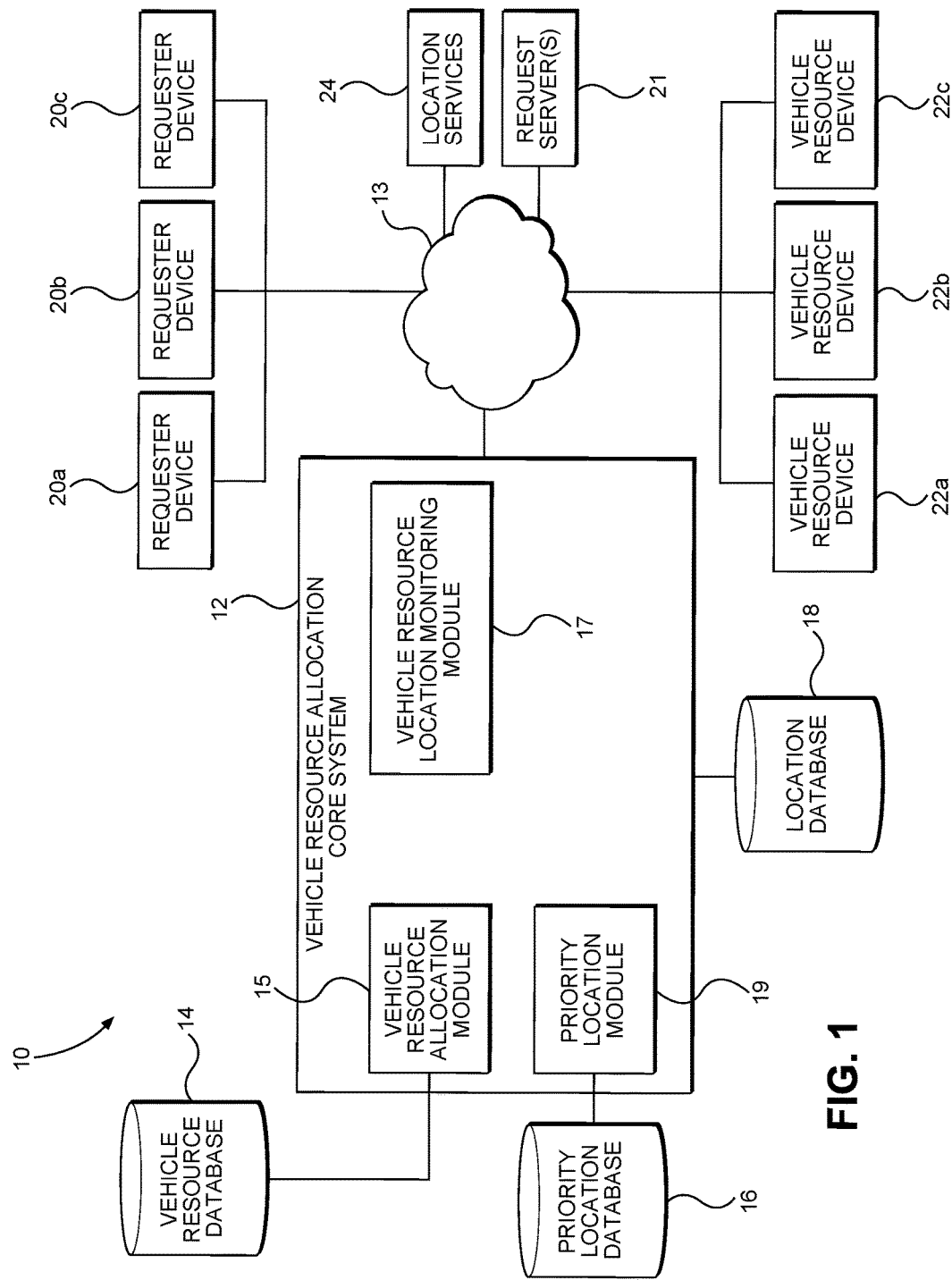
FIG. 1 is a schematic diagram of a system for management of a plurality of vehicle resources according to various aspects of the present invention.

In brief, various embodiments of the present invention allow for vehicles and other types of vehicle resources to be allocated to vehicle requests and other types of vehicle requirements in a way that provides effective management of a fleet of vehicles whilst minimising distance travelled by vehicles in fulfilling the vehicle requests. Advantageously, one or more embodiments of the present invention provide for the above benefits whilst providing a relatively low burden on computer system resources that perform the allocation.

In accordance with some embodiments, a pool of candidate vehicles is identified (e.g., from a total fleet of vehicles) in a low computational cost manner. The candidate vehicles may be assessed, in accordance with one or more embodiments, for their suitability for a given vehicle request.

In one or more embodiments, a most suitable vehicle for an advance vehicle request (e.g., a requirement for a vehicle to be at a specified location at a later time) is identified and allocated to fulfil the advance vehicle request. In accordance with some embodiments, the vehicle is allocated only when it is determined that the vehicle needs to be allocated, such as to meet a timing requirement associated with the advance vehicle request. In one embodiment, a specific vehicle may not be allocated to an advance vehicle request until it is determined (e.g., by a vehicle resource allocation server) that a specific vehicle needs to be allocated at that time in order to have the vehicle reach a first requested location associated with the advance vehicle request by a certain time. A first requested location may be referred to in this disclosure as a 'start location,' even if that location is the only requested location.

In one example, a specific police vehicle may not be allocated automatically to fulfil a scheduled requirement for a police vehicle to be at a requested location (e.g., an intersection where construction is taking place, in order to provide for traffic control) until a vehicle resource allocation system determines when a vehicle must be allocated in order to have a vehicle arrive at the specific location on time (e.g., in accordance with the scheduled time). The determination of when the vehicle needs to be allocated may be based on, in accordance with some embodiments: iterative and/or real-time monitoring of statuses and/or locations of a pool of available vehicles, and/or one or more timing factors (e.g., current time, start time for the request, journey times for candidate vehicles). In another example, a system for allocating private hire vehicles may not allocate a particular one of a fleet of private hire vehicles to fulfil an advance customer booking until the system automatically determines, based on the then-available pool of vehicles potentially able to fulfil the booking (e.g., those within a suitable range of the requested pickup location) and one or more timing and/or other factors (as described with respect to various embodiments in this disclosure), that a vehicle needs to be allocated in order to arrive at the requested pickup location in time to fulfil the booking.

In accordance with some embodiments, because advanced processing is performed only for the most suitable candidate vehicle, the relatively computationally expensive process of determining road journey times is performed a relatively small number of times.

In some embodiments, before actual allocation (e.g., before an allocation time determined automatically by an allocation system), each candidate vehicle may be reassessed such that a different vehicle may be found to be the most suitable vehicle, and/or the makeup of the set of candidate vehicles to be analysed may be reassessed based on various factors.

In accordance with some embodiments, in meeting requests for vehicle resources, the vehicle resource allocation system assigns vehicles to particular locations (e.g., requested destinations or objectives) such that vehicles of a fleet may not only be allocated efficiently (e.g., the most suitable vehicle is allocated to a request), but the allocation process itself may be configured to make an allocation at an optimised time. Moreover, in some embodiments, these advantages may be achieved automatically.

The inventors have recognized that the automatic allocation of future vehicle requirements is a very different process from the manual process for bookings that was used previously, and introduces many challenges. Improved allocation can provide positive effects in a number of areas including the processing, memory and other computing and communication resources that are required. Reassessment and allocation of the most suitable vehicle at a relatively late time allows better use of the vehicle and other resources of the fleet. Other effects can include improved vehicle fleet utilisation and lower distances traveled in fulfilling customer bookings. Advance requests (e.g., scheduled deliveries, advance private hire taxi bookings) also can be met more efficiently. This also contributes to minimizing distances traveled by the vehicles of a fleet, reducing fuel costs, improved vehicle utilisation, reduced vehicle wear and tear, and reduced driver fatigue. Further advantages can be felt in terms of customer satisfaction and driver wellbeing and happiness.

A vehicle resource allocation system, in accordance with some embodiments, allocates vehicles to one or more particular locations, such as in response to a request for a vehicle resource received over a communication network, and/or in response to another indication of a need (or potential need) for a vehicle resource at a particular location. Requests for vehicle resources may include any number of particular locations, such as in the case where a vehicle is assigned a task to transport goods and/or people from a first location (e.g., a pickup location) to a second location (e.g., a drop-off location), or to travel a particular route including two or more specific locations (e.g., points of interest, patrol waypoints).

Various types of vehicle resources may be managed in accordance with various aspects of the present invention. In one example, public and/or private service providers (e.g., police, medical service providers, security, utility service providers, delivery service providers), may need to allocate vehicles (e.g., police vehicles, delivery vehicles) to specific locations. In another example, a vehicle resource allocation system of a private hire booking service may allocate vehicles (e.g., private taxis) to pick up and drop off travelers.

Vehicle resources may include, by way of example and without limitation, land vehicles (e.g., cars, trucks, taxis, construction equipment, etc.), watercraft (e.g., boats, ships, etc.), aircraft (e.g., airplanes, helicopters, aerial drones, etc.), and/or spacecraft. Although some example vehicles discussed in this disclosure are described as having drivers, it will be readily understood that vehicles that may be allocated in accordance with embodiments of the present invention may be manned or autonomous (unmanned), may be operated by a human operator with the vehicle, and/or may be operated remotely by a human and/or computer operator.

In accordance with some embodiments, a vehicle resource allocation controller device for allocating vehicle resources is adapted to execute a vehicle resource allocation module for dynamically allocating vehicle resources (e.g., in response to vehicle requests) by performing one or more of the operations described in this disclosure. In some embodiments, the vehicle resource allocation controller device may determine respective locations associated with each of a plurality of vehicle resources. For example, the associated location may comprise a current geolocation of a vehicle (e.g., determined by receiving geolocation information about the location of a vehicle resource device associated with the vehicle resource). In another example, the associated location may comprise a destination location to which a vehicle is currently heading (or at which it is expected to arrive at some later time), such as a location requested in a previous vehicle request. In some embodiments, the vehicle resource allocation controller device may be in communication with a plurality of vehicle resource devices (e.g., that are in or are in communication with vehicle resources) and/or with a plurality of requester devices (e.g., for use by requesters to make vehicle requests).

In accordance with some embodiments, systems and apparatus for allocating networked vehicle resources provide for one or more of:

- a plurality of vehicle resource devices (e.g., each vehicle resource device being associated with a respective vehicle resource of a plurality of vehicle resources);
- a plurality of requester devices (e.g., each requester device being associated with a respective requester of vehicle resources);
- a vehicle resource allocation controller device;
- a priority location ('hot spot') database;
- a vehicle resource allocation module;
- a vehicle resource database;
- a vehicle resource location monitoring module;
- a priority location module for managing information about and/or defining hot spots;
- a map and/or location database; and/or
- at least one location service (e.g., a global positioning system (GPS), a Wi-Fi® network device-based location service).

In accordance with some embodiments, systems, methods, apparatus, and computer-readable media for allocating a vehicle resource to a future vehicle requirement provide for:

- calculating a score for each candidate vehicle resource in a pool of candidate vehicle resources, based on a vehicle request;
- calculating a journey time from a vehicle location associated with at least one candidate vehicle resource (e.g., a current location, an expected destination location) to a start location associated with a vehicle request;
- repeating (e.g., periodically, according to a schedule, and/or at a predetermined time) the calculating of the score and the journey time for the candidate vehicle resource, until determining there is a need to allocate a specific vehicle resource to the vehicle request; and
- upon determining there is a need to allocate a specific vehicle resource to the vehicle request, allocating a vehicle resource of the pool of candidate vehicle resources to the vehicle request (e.g., allocating the vehicle resource having the best score of the scores calculated most recently).

In accordance with some embodiments, systems, methods, apparatus, and computer-readable media for allocating a vehicle resource to a future vehicle requirement provide for:

forming a pool of candidate vehicle resources for possible fulfillment of a vehicle request;

calculating a respective score for each candidate vehicle resource in the pool of candidate vehicle resources, based on the vehicle request;

for one or more of the candidate vehicle resources in the pool of candidate vehicle resources, calculating a respective journey time from a respective vehicle location associated with the candidate vehicle resource to a start location associated with the vehicle request;

automatically determining it is time to allocate a vehicle resource to the vehicle request, based on the respective scores calculated for the candidate vehicle resources of the pool of candidate vehicle resources and the calculated one or more respective journey times; and upon determining it is time to allocate a vehicle resource to the vehicle request, allocating a vehicle resource of the pool of candidate vehicle resources to the vehicle request.

In accordance with some embodiments, systems, methods, apparatus, and computer-readable media for allocating a vehicle resource to a future vehicle requirement provide for:

determining that a current time has a predetermined relationship with respect to a start time associated with a first vehicle request;

forming a pool of candidate vehicle resources for possible fulfillment of the first vehicle request;

for each candidate vehicle resource in the pool of candidate vehicle resources, calculating a respective first score that is related to the suitability of the candidate vehicle resource to fulfil the first vehicle request;

for one or more of the candidate vehicle resources in the pool of candidate vehicle resources, calculating a respective first journey time from a respective first vehicle location associated with the candidate vehicle resource to a start location associated with the first vehicle request;

for each candidate vehicle resource in the pool of candidate vehicle resources, calculating a respective second score that is related to the suitability of the candidate vehicle resource to fulfil the first vehicle request;

for one or more of the candidate vehicle resources in the pool of candidate vehicle resources, calculating a respective second journey time from a respective second vehicle location associated with the candidate vehicle resource to the start location associated with the first vehicle request;

determining that there is a need to allocate a vehicle resource to the first vehicle request, using both:
1) the respective second scores calculated for the candidate vehicle resources of the pool of candidate vehicle resources, and
2) the calculated one or more respective second journey times;

after determining that there is a need to allocate a vehicle resource to the first vehicle request, allocating to the first vehicle request a vehicle resource of the pool of candidate vehicle resources based on the respective second score for the vehicle resource.

In accordance with some embodiments, systems, methods, apparatus, and computer-readable media for allocating a vehicle resource to a future vehicle requirement provide for:

a) storing (e.g., by a vehicle resource allocation controller device), plural vehicle requirements in the form of plural vehicle requests, each vehicle request including at least a respective start time and a respective start location;

b) for a first vehicle request of the plural vehicle requests, automatically determining that a current time has a predetermined relationship with respect to the start time of the first vehicle request;

c) in response to the determining at step b), forming a pool of candidate vehicle resources for possible fulfillment of the first vehicle request;

d) for each candidate vehicle resource in the pool of candidate vehicle resources, calculating a respective score that is related to the suitability of the candidate vehicle resource to fulfil the first vehicle request;

e) for one or more of the candidate vehicle resources in the pool of candidate vehicle resources, calculating a respective journey time from the candidate vehicle resource's associated vehicle location to the start location included in the first vehicle request;

f) determining whether there is a need to allocate a vehicle resource to the first vehicle request, using both:
1) the respective scores calculated for the candidate vehicle resources of the pool of candidate vehicle resources, and
2) the calculated one or more respective journey times;

g) performing steps d), e) and f) at least two times for the first vehicle request until it is determined at step f) that there is a need to allocate a vehicle resource to the first vehicle request; and h) on determining at step f) that there is a need to allocate a vehicle resource to the first vehicle request, allocating to the first vehicle request a vehicle resource of the pool of candidate vehicle resources based on the respective scores calculated on last performance of step d).

In one or more embodiments, allocating a vehicle resource may comprise allocating the vehicle resource determined to have had the best calculated score.

In accordance with some embodiments, calculating a journey time may be performed for some but not all of the candidate vehicles in a pool of candidate vehicles.

In one or more embodiments, the forming of a pool of candidate vehicle resources may be performed two or more times (e.g., until it is determined that there is a need to allocate a specific vehicle resource to a vehicle request). For example, the pool of candidate vehicle may be reassessed and modified for subsequent analysis (e.g., calculating of scores and/or journey times).

In some embodiments, calculating a journey time from the first location may comprise calculating a journey time from a current location of the vehicle to a pickup location included in the first vehicle request, or it may comprise calculating a journey time from a drop-off location of a customer booking that the vehicle is currently fulfilling to the start location for the first vehicle request (e.g., a pickup location for a different customer booking that is yet to be allocated).

In some embodiments, calculating a journey time may comprise, for a given vehicle resource, choosing between one of the following (e.g., based on a status of the vehicle resource):

1) calculating a journey time from the vehicle resource's associated location by calculating a journey time from a current location of the vehicle to the start location for the vehicle request (e.g., a start location included in the vehicle request), and
2) calculating a journey time from the vehicle resource's associated location by calculating a journey time from a destination location (e.g., a patrol waypoint, a drop-off location for a private hire taxi customer) that the vehicle is currently fulfilling to the start location for the first vehicle request.

In some embodiments, determining that a current time has a predetermined relationship with respect to the start time of a vehicle request may comprise determining that the current time is at least approximately a predetermined time before the start time of the first vehicle request (e.g., is between 15 and 40 minutes before the start time of the first booking). The predetermined time may be dependent, for example, on the start location for the vehicle request.

According to some embodiments, forming a pool of plural candidate vehicles for possible fulfillment of a vehicle request may comprise rejecting vehicles of a fleet that have a status that is inconsistent with the vehicle potentially being able to fulfil the vehicle request.

In some embodiments, forming a pool of plural candidate vehicles for possible fulfillment of a vehicle request may comprise selecting a predetermined number of candidate vehicles that are geographically closest to the start location associated with the vehicle request.

In some embodiments, forming a pool of plural candidate vehicles for possible fulfillment of a vehicle request may comprise calculating a direct distance between vehicles of the fleet and a start location associated with the vehicle request.

In some embodiments, forming a pool of plural candidate vehicles for possible fulfillment of a vehicle request may comprise selecting a predetermined number of candidate vehicles that are geographically closest to a requested location included in the vehicle request in terms of the direct distance between the candidate vehicles of the fleet and the requested location included in the vehicle request. In one non-limiting example, the predetermined number may be between 10 and 100.

In some embodiments, calculating a score that is related to the suitability of a vehicle to fulfil a vehicle request may comprise calculating sub scores for each of plural factors and performing a mathematical operation on the sub scores.

In one or more embodiments, forming a pool of plural candidate vehicles for possible fulfillment of a vehicle request may comprise calculating a direct distance between vehicles of the fleet and a start location associated with the vehicle request and wherein calculating a journey time from a respective location associated with each candidate vehicle to the start location may comprise using a map database.

In some embodiments, calculating a journey time from a location associated with a vehicle resource to a start location for the vehicle request may comprise using a map database.

In one or more embodiments, calculating a journey time from a location associated with a vehicle resource to a start location for the vehicle request may comprise using historical or current data about traffic delays on one or more routes between a current location of the vehicle and the start location.

In some embodiments, calculating a journey time from a location associated with a vehicle resource to a start location for the vehicle request may comprise using historical or current data about traffic delays or average speeds on one or more routes between the location associated with the vehicle resource to a start location for the vehicle request, to calculate a fastest route between the location associated with a vehicle resource to a start location for the vehicle request.

In one or more embodiments, determining whether there is a need to allocate a specific vehicle to a vehicle request may comprise determining whether a calculated journey time from a location associated with a vehicle resource to a start location for the vehicle request for a vehicle determined to have a corresponding score better than scores for other vehicles in the pool of candidate vehicles meets a predetermined relationship with respect to a time remaining from the current time to the start time of the vehicle request.

In some embodiments, determining whether there is a need to allocate a vehicle to a vehicle request may comprise determining whether the sum of an allocation buffer value and a calculated journey time from a location associated with a vehicle resource to a start location for the vehicle request for a vehicle determined to have a corresponding score better than scores for other vehicles in the pool of candidate vehicles meets a predetermined relationship with respect to a time remaining from the current time to the start time of the vehicle request.

According to some embodiments, operations for allocating a vehicle resource to a future vehicle requirement may comprise:
  performing steps for calculating scores, calculating journey times, and determining whether there is a need to allocate a vehicle request, at least two times for the vehicle request until it is determined that there is a need to allocate the vehicle request; and
  then allocating to the vehicle request the vehicle determined to have had the best score on last performance of calculating scores.

In accordance with some embodiments, systems, methods, apparatus, and computer-readable media for allocating a vehicle resource to a future vehicle requirement provide for:
  a) storing plural vehicle requirements in the form of plural customer bookings, each customer booking including at least a start time and a pickup location;
  b) in respect of a first customer booking, automatically determining that a current time has a predetermined relationship with respect to the start time of the first booking;
  c) in response to the determining, forming a pool of plural candidate vehicles for possible fulfillment of the customer booking, wherein the pool of candidate vehicles may comprise fewer than the number of vehicles that are available to fulfil the booking;
  d) for each vehicle in the pool of candidate vehicles, calculating a score that is related to the suitability of the vehicle to fulfil the booking;
  e) for one or more of the vehicles in the pool of candidate vehicles, calculating a journey time from a first location to the pickup location included in the first booking;
  f) using both:
    1) the scores calculated for the vehicles of the pool of candidate vehicles, and
    2) the calculated one or more journey times,
  to determine whether there is a need to allocate the first booking;
  g) performing steps d), e) and f) at least two times for the first booking until it is determined at step f) that there is a need to allocate the first booking; and h) following g), allocating to the first booking the vehicle determined to have had the best score or one of the best scores on last performance of step d).

The invention also provides apparatus for allocating a vehicle resource to a future vehicle requirement, the apparatus comprising means configured for:
 a) storing plural vehicle requirements in the form of plural customer bookings, each customer booking including at least a start time and a pickup location;
 b) in respect of a first customer booking, automatically determining that a current time has a predetermined relationship with respect to the start time of the first booking;
 c) in response to the determining, forming a pool of plural candidate vehicles for possible fulfillment of the customer booking, wherein the pool of candidate vehicles may comprise fewer than the number of vehicles that are available to fulfil the booking;
 d) for each vehicle in the pool of candidate vehicles, calculating a score that is related to the suitability of the vehicle to fulfil the booking;
 e) for one or more of the vehicles in the pool of candidate vehicles, calculating a journey time from a first location to the pickup location included in the first booking;
 f) using both:
  1) the scores calculated for the vehicles of the pool of candidate vehicles, and
  2) the calculated one or more journey times,
 to determine whether there is a need to allocate the first booking;
 g) performing steps d), e) and f) at least two times for the first booking until it is determined at step f) that there is a need to allocate the first booking; and
 h) following g), allocating to the first booking the vehicle determined to have had the best score or one of the best scores on last performance of step d).

The means configured for performing step h) may comprise means configured for allocating the vehicle determined to have had the best score on the last performance of step d) to the first booking.

The apparatus may comprise means configured for performing step e) for some but not all of the vehicles in the pool of vehicles formed at step c).

The means configured for calculating a journey time from the first location may comprise means configured for calculating a journey time from a current location of the vehicle to the pickup location included in the first booking.

The means configured for calculating a journey time from the first location may comprise means configured for calculating a journey time from a drop-off location of a customer booking that the vehicle is currently fulfilling to the vehicle to the pickup location included in the first booking. The apparatus may comprise means configured for choosing between:
 1) calculating a journey time from the first location by calculating a journey time from a current location of the vehicle to the pickup location included in the first booking, and
 2) calculating a journey time from the first location by calculating a journey time from a drop-off location of a customer booking that the vehicle is currently fulfilling to the vehicle to the pickup location included in the first booking, based on a status of the vehicle.

The means configured for determining that a current time has a predetermined relationship with respect to the start time of the first booking may comprise means configured for determining that the current time is at least approximately a predetermined time before the start time of the first booking, for instance is between 15 and 40 minutes before the start time of the first booking. The predetermined time may be dependent on the pickup location for the first booking.

The means configured for forming a pool of plural candidate vehicles for possible fulfillment of the first booking may comprise means configured for rejecting vehicles of the fleet that have a status that is inconsistent with the vehicle potentially being able to fulfil the booking.

The means configured for forming a pool of plural candidate vehicles for possible fulfillment of the first booking may comprise means configured for selecting a predetermined number of candidate vehicles that are geographically closest to the pickup location included in the first booking. The means configured for forming a pool of plural candidate vehicles for possible fulfilment of the first booking may comprise means configured for calculating a direct distance between vehicles of the fleet and the pickup location included in the first booking. The means configured for forming a pool of plural candidate vehicles for possible fulfilment of the first booking may comprise means configured for selecting a predetermined number of candidate vehicles that are geographically closest to the pickup location included in the first booking in terms of the direct distance between the candidate vehicles of the fleet and the pickup location included in the first booking. The predetermined number may be between 10 and 100.

The means configured for performing step g) may comprise means configured for performing steps c), d), e) and f) at least two times for the first booking until it is determined at step f) that there is a need to allocate the first booking The means configured for calculating a score that is related to the suitability of the vehicle to fulfil the booking may comprise means configured for calculating sub scores for each of plural factors and performing a mathematical operation on the sub scores.

The means configured for forming a pool of plural candidate vehicles for possible fulfillment of the first booking may comprise means configured for calculating a direct distance between vehicles of the fleet and the pickup location included in the first booking and wherein the means configured for calculating a journey time from the first location to the pickup location included in the first booking may comprise means configured for using a map database.

The means configured for calculating a journey time from the first location to the pickup location included in the first booking may comprise means configured for using a map database.

The means configured for calculating a journey time from the first location to the pickup location included in the first booking may comprise means configured for using historical or current data about traffic delays on one or more routes between the current location of the vehicle and the pickup location included in the first booking The means configured for calculating a journey time from the first location to the pickup location included in the first booking may comprise means configured for using historical or current data about traffic delays or average speeds on one or more routes between the first location and the pickup location included in the first booking to calculate a fastest route between the first location and the pickup location included in the first booking The means configured for determining whether there is a need to allocate the first booking may comprise means configured for determining whether a calculated journey time from the first location to the pickup location included in the first booking for a vehicle determined in step d) to be better than scores for other vehicles in the pool of candidate vehicles meets a predetermined relationship with respect to a time remaining from the current time to the start time of the first booking.

The means configured for determining whether there is a need to allocate the first booking may comprise means configured for determining whether the sum of an allocation buffer value and a calculated journey time from the first location to the pickup location included in the first booking for a vehicle determined in step d) to be better than scores for other vehicles in the pool of candidate vehicles meets a predetermined relationship with respect to a time remaining from the current time to the start time of the first booking.

An apparatus, in accordance with some embodiments, may comprise means configured for:

g) performing steps d), e) and f) at least two times for the first booking until it is determined at step f) that there is a need to allocate the first booking; and h) following g), allocating the vehicle determined to have had the best score on last performance of step d) to the first booking.

In accordance with some embodiments, systems, methods, apparatus, and computer-readable media for allocating a vehicle resource to a future vehicle requirement provide for:

identifying Y candidate vehicles that have potential to fulfil a vehicle request, scoring the Y candidate vehicles as to their suitability to fulfil the vehicle request, choosing Z of the Y candidate vehicles based on their scores, wherein the value of Z is lower than the value of Y, calculating road journey times for the Z vehicles (e.g., but not for all Y vehicles), using the calculated road journey time for at least one vehicle to determine whether to allocate the vehicle, and repeating the scoring and calculating steps until it is determined to allocate the vehicle.

In accordance with some embodiments, identifying Y candidate vehicles that have potential to fulfil a vehicle request may be performed in response to detecting that a current time is a predetermined time ahead of a start time for the vehicle request.

In accordance with some embodiments, systems, methods, apparatus, and computer-readable media for allocating a vehicle resource to a future vehicle requirement provide for:

calculating road journey times for one or more of Z vehicles each associated with a location that meets a predetermined criterion with respect to a start location for a vehicle request (e.g., an assigned standby area for an emergency vehicle, a pickup location for a private hire vehicle booking), using the calculated road journey time for at least one vehicle to determine whether to allocate the vehicle, and repeating the calculating and using steps until it is determined to allocate a vehicle to the booking.

In accordance with some embodiments, systems, methods, apparatus, and computer-readable media for allocating a vehicle resource to a future vehicle requirement provide for:

identifying Y candidate vehicles that have potential to fulfil the future vehicle requirement, scoring the Y candidate vehicles as to their suitability to fulfil the future vehicle requirement, choosing Z of the Y candidate vehicles based on their scores, wherein the value of Z is lower than the value of Y, calculating road journey times for the Z vehicles but not for all Y vehicles, repeating the scoring and calculating steps at least once and then allocating a vehicle to fulfil the future vehicle requirement.

Another aspect of the invention provides apparatus for allocating a vehicle resource to a future vehicle requirement, the apparatus comprising means for:

responding to detecting that a current time is a predetermined time ahead of a start time for a customer booking that constitutes the future vehicle requirement by identifying Y candidate vehicles that have potential to fulfil the booking, scoring the Y candidate vehicles as to their suitability to fulfil the booking, choosing Z of the Y candidate vehicles based on their scores, wherein the value of Z is lower than the value of Y, calculating road journey times for the Z vehicles but not for all Y vehicles, using the calculated road journey time for at least one vehicle to determine whether to allocate the vehicle, and repeating the scoring and calculating steps until it is determined to allocate the vehicle.

Another aspect of the invention provides apparatus comprising means for:

calculating road journey times for one or more of Z vehicles each associated with a location that meets a predetermined criterion with respect to a pickup location for a private hire vehicle booking, using the calculated road journey time for at least one vehicle to determine whether to allocate the vehicle, and repeating the calculating and using steps until it is determined to allocate a vehicle to the booking.

Another aspect of the invention provides apparatus for allocating a vehicle resource to a future vehicle requirement, the apparatus comprising means for:

identifying Y candidate vehicles that have potential to fulfil the future vehicle requirement, scoring the Y candidate vehicles as to their suitability to fulfil the booking, choosing Z of the Y candidate vehicles based on their scores, wherein the value of Z is lower than the value of Y, calculating road journey times for the Z vehicles but not for all Y vehicles, repeating the scoring and calculating steps at least once and then allocating a vehicle to fulfil the vehicle requirement.

Other aspects of the invention provide corresponding apparatus, computer programs, and computer readable media for performing any one or more of the methods of the present disclosure. Some embodiments comprise computer programs comprising machine readable instructions that when executed by computing apparatus causes it to perform any one or more of the described methods of allocating a vehicle resource to a future vehicle requirement. Some embodiments comprise a non-transitory computer-readable storage medium having stored thereon computer-readable code (e.g., computer software instructions), which, when executed by computing apparatus, causes the computing apparatus to perform any one or more of the described methods of allocating a vehicle resource to a future vehicle requirement. Some embodiments comprise apparatus having at least one processor and at least one memory having computer-readable code stored thereon which when executed controls the at least one processor to allocate a vehicle resource to a future vehicle requirement by performing the steps of one or more of the described methods.

FIG. 1 is a schematic diagram of an example system for management of a plurality of vehicle resources according to various aspects of the present invention. As depicted in FIG. 1, example system 10 includes a number of interconnected components, as will now be described. The system 10 includes a vehicle resource allocation core system 12. This comprises one or more server computers running system software that ensures smooth operation of the system 10. In accordance with some embodiments, the vehicle resource allocation core system 12 may comprise one or more vehicle resource allocation controller devices. One or more of the represented components of the system 10 may be in communication with at least one other component using one or more communication networks, such as the example communications network 13.

Key functions of the system 10 include the allocation of vehicle resources from a plurality of vehicle resources (e.g., first responder vehicles, public or private security vehicles, military vehicles, private hire vehicles) to at least one requested particular location (e.g., a booking for a passenger pickup and drop-off). As discussed further with respect to example system 100 (FIG. 5a and FIG. 5b), additional functions may include vehicle and driver management, account management, and/or record keeping.

The requesting function may be provided, in some embodiments, using one or more requester devices 20a-c in communication with one or more request servers 21 (e.g., a web-based request server, an application server, and/or a call centre terminal) in communication with the core system 12.

The allocation function is provided primarily by a vehicle resource allocation module 15, with information from other parts of the system 10.

In some embodiments, the priority location module 19 provides for one or more of: determining information about hot spots and other priority locations (e.g., by accessing priority location database 16), defining hot spots dynamically and/or in response to user input (e.g., hot spot definition information received using a user interface), and providing one or more user interfaces for receiving, transmitting, and managing information about hot spots (e.g., attraction distances, periodicity information).

In some embodiments, vehicle resource location monitoring (e.g., monitoring the locations of vehicles, associated vehicle resource devices, and/or drivers) is provided primarily by a vehicle resource location monitoring module 17, with reference, as necessary, to the vehicle resource database 14, vehicle resource devices 22a-c, and/or location service(s) 24, as well as other components of the system 100.

The system 10 may include one or more database functions, such as vehicle resource database 14, priority location database 16, and location database 18. The vehicle resource database 14 includes information about vehicle resources managed by the system 10. The priority location database 16 includes information about hot spots identified in the system 10, and may include information about extended priority zones associated with hot spots, attraction distances, and/or other types of parameters associated with defined hot spots. The locations database 18 may comprise maps and/or other types of information describing locations to which vehicle resources may be allocated (e.g., street addresses, GPS coordinates, points of interest information, etc.). Some additional or alternative types of databases that may be suitable for some desired embodiments are described further with respect to FIG. 5a and FIG. 5b.

The system 10 may further comprise one or more types of location service(s) 24, such as GPS systems and/or other types of device location services that may be useful for determining locations of any of requester devices 20a-c and/or of vehicle resource devices 22a-c. Each of vehicle resource devices 22a-c may be associated with a respective vehicle resource. A vehicle resource device may comprise a mobile computing device, smartphone, GPS component, and/or communications device configured to determine a location of a vehicle resource and/or to transmit information to the vehicle resource device about allocated tasks and destinations (e.g., transmitting an assigned destination to a vehicle's driver).

Figure 2A:
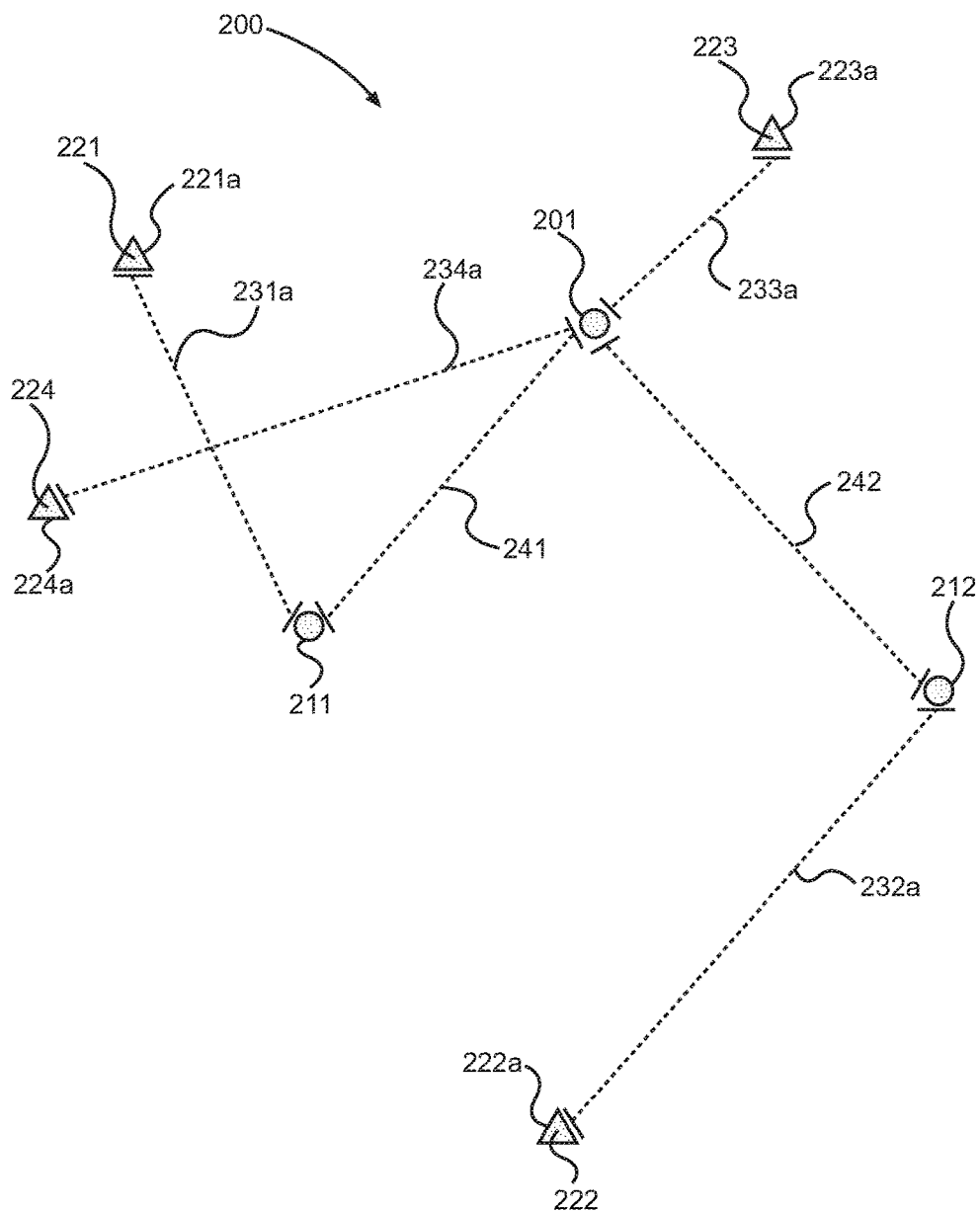
FIG. 2a is an example representation of a geographical area including locations of a plurality of vehicle resources and locations to be serviced, according to various aspects of the present invention.
Figure 2B:
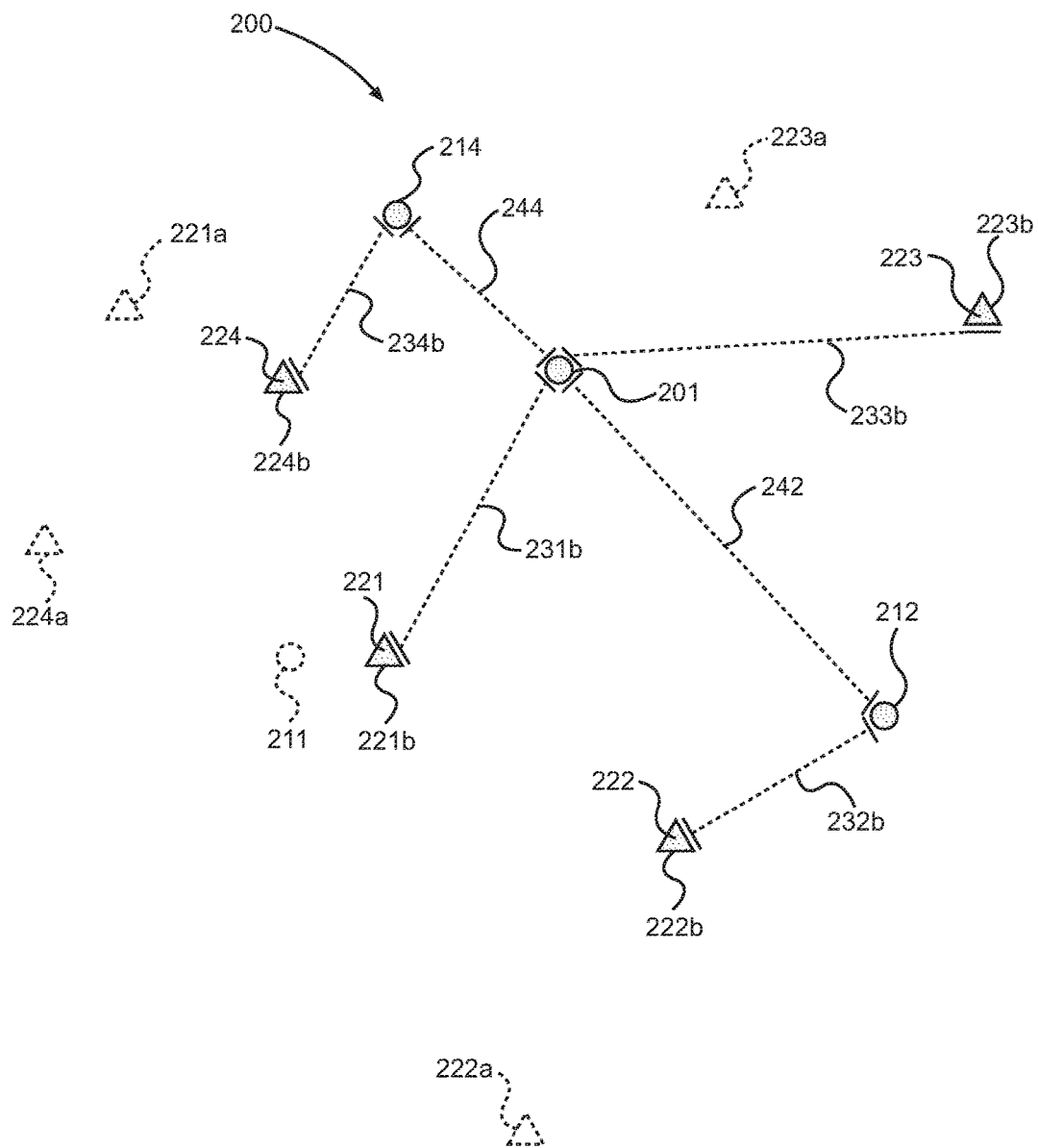
FIG. 2b is an example representation of the geographical area of FIG. 2a showing locations of the plurality of vehicle resources and locations to be serviced, at a later time, according to various aspects of the present invention.

FIG. 2a is an example representation 200 of an example geographical area including a plurality of vehicle resources and locations to be serviced, according to various aspects of the present invention. The example representation 200 of FIG. 2a depicts various types of information related to vehicle resources of a vehicle resource allocation system and to vehicle requests being handled by the vehicle resource allocation system at a particular point in time (e.g., at the initiation of a process to allocate a vehicle to a particular vehicle request). FIG. 2b, discussed below, depicts an example of information related to the vehicle resources and vehicle requests at a later point in time (e.g., later in a process to allocate a vehicle to the vehicle request). Put another way, FIG. 2a depicts a first example state of mobile objects being managed by a vehicle resource allocation system during an allocation process, in accordance with some embodiments of the present invention, and FIG. 2b depicts a second example state of those mobile objects later during that allocation process.

The example representation 200 includes a start location 201 that is associated with an example vehicle request. The vehicle request may be, for example, a request to send a vehicle (e.g., a utility repair vehicle, a police car, an ambulance or other medical transport vehicle, a taxi vehicle), of a fleet of potentially available vehicles, to the start location 201. Other examples of vehicle requests are described in this disclosure, and other types contemplated by aspects of the present invention may be readily understood by those skilled in the art in light of this disclosure.

The start location 201, as discussed with respect to various examples in this disclosure, may be any requested location for a vehicle or other mobile resource, including, without limitation, the location of a shipment or passenger for pick up, the requested location for a security or police vehicle (e.g., to provide security at a large event at the requested location, or in response to a reported incident requiring a police response at the requested location), or the requested location for an autonomous (unmanned) aerial or land-based reconnaissance vehicle). The start location 201 may be the only location associated with a vehicle request, or may be one of a plurality of requested locations associated with a vehicle request. For example, a request for a delivery may include both a pickup location for a shipment, and a drop-off location. In another example, a request for a vehicle patrol may include a sequence of different patrol locations or waypoints that a vehicle is to drive to on the requested patrol.

The respective current vehicle locations 221a, 222a, 223a, and 224a of a plurality of vehicle resources 221, 222, 223, and 224 are also represented in the example representation 200. As discussed in this disclosure, the vehicle resources 221, 222, 223, and 224 may be a fleet (or a portion of a fleet) of vehicles that are potentially available to be allocated to the start location 201 in response to the corresponding vehicle request.

As discussed with respect to various embodiments in this disclosure, one or more vehicle resources may currently be fulfilling a previously-allocated vehicle request (other than the request associated with start location 201). In the example representation, the vehicle resource 221 shown at current vehicle location 221a is currently fulfilling a request that will take it to location 211, and the vehicle resource 222 shown at current vehicle location 222a is currently fulfilling a request that will take it to location 212. The vehicle resource 223 shown at current vehicle location 223a and the vehicle resource 224 shown at current vehicle location 224a are not, according to the example, currently fulfilling any vehicle requests.

As discussed in more detail below with respect to the example allocation process 300 of FIG. 3, it may be useful, in allocating vehicle resources in accordance with some embodiments, to determine a distance a vehicle resource will have to travel from one location to another, such as from its current location to a start location (e.g., start location 201), and/or from its current assigned destination location to a requested start location for a vehicle request that is yet to be allocated. Such a distance may be useful, for example, in calculating a respective score for a vehicle resource (e.g., a distance score, as discussed further below).

As also discussed in more detail below with respect to the example allocation process 300 of FIG. 3, it may be useful, in allocating vehicle resources in accordance with some embodiments, to determine a time that it is expected to take a vehicle resource to travel from one location to another, such as from its current location to a requested location (e.g., start location 201), and/or from its current assigned destination location to a requested start location for a vehicle request that is yet to be allocated. This determined time is also referred to in this disclosure as a 'journey time' for a given vehicle resource. The journey time may be useful, in some embodiments, in determining whether there is a need to allocate a specific vehicle to a vehicle request.

In the example representation 200, measure 231a may represent a measure of distance (e.g., expressed in miles or kilometers), a distance score, and/or a journey time (e.g., expressed in minutes) from the current vehicle location 221a of vehicle resource 221 to its current destination location 211. Measure 241 represents a measure of distance, a distance score, and/or a journey time from the destination location 211 to the start location 201. Accordingly, in allocating a vehicle resource to start location 201, an allocation process may use the information about the vehicle resource 221, including measure 231a and/or measure 241, to determine whether the vehicle resource 221 is a candidate for being allocated to start location 201, to determine whether the vehicle resource 221 is the best candidate vehicle to allocate to start location 201, and/or to determine when a specific vehicle needs to be allocated to the vehicle request for start location 201.

Similarly, measure 232a may represent a measure of distance, a distance score, and/or a journey time from the current vehicle location 222a of vehicle resource 222 to its current destination location 212, and measure 242 may present a measure of distance, a distance score, and/or a journey time from the destination location 212 to the start location 201.

Vehicle resources 223 and 224, according to the depicted example, do not have current destination locations (i.e., they are currently free to be allocated to vehicle requests). Measure 233a may present a measure of distance, a distance score, and/or a journey time from the current vehicle location 223a of vehicle resource 223 to the start location 201. Similarly, measure 234a may present a measure of distance, a distance score, and/or a journey time from the current vehicle location 224a of vehicle resource 224 to the start location 201.

In accordance with some embodiments of the present invention, one or more functions of a process to allocate a vehicle resource to a future vehicle requirement may be iterated (e.g., periodically and/or according to a schedule), for example, until it is determined that it is time to allocate a vehicle to the vehicle request. As discussed below with respect to FIG. 3, an allocation process in accordance with some embodiments may perform functions of identifying candidate vehicles and/or calculating scores for those vehicles, for a given vehicle request, more than once (e.g., every minute, every ten minutes). In this way, requests may be fulfilled in an efficient manner.

Referring now to FIG. 2b, the example representation 200 has been modified to depict information about the state of an example system of mobile objects at a time that is after the state of the system depicted in FIG. 2a. For example, the representation 200 in FIG. 2b may represent information that was updated after an initial performance of an allocation process to allocate a vehicle resource to start location 201. Had a vehicle resource been allocated based on the state of the system in FIG. 2a, a different vehicle resource might have been allocated to start location 201 than would be allocated based on the later state of the system depicted in FIG. 2b.

According to the example information depicted in FIG. 2b, vehicle resource 221 has completed its previous request (e.g., by traveling to previously-assigned destination location 211) and is now free and at current vehicle location 221b. The measure 231b now represents a distance, distance score, and/or journey time with respect to the current vehicle location 221b and the start location 201.

Also according to the example updated information represented in FIG. 2b, vehicle resource 222 is now at current vehicle location 222b, which is closer to its current destination location 212, as indicated by the reduced (relative to measure 232a) measure 232b.

Vehicle resource 223, now at current vehicle location 223b, is now farther from the start location 201, as indicated by the reduced (relative to measure 233a) measure 233b.

Also according to the example updated information represented in FIG. 2b, vehicle resource 224 has, in the time between the time of the state represented in FIG. 2a and the time of the state represented in FIG. 2b, moved to current vehicle location 224b, and has been assigned a vehicle request to travel to destination location 214. Depending on various timing factors (e.g., the current time and the start time for the vehicle request for start location 201 and/or the time between any additional iterations in the allocation analysis), the vehicle resource 224 may still be considered for fulfilling the vehicle request to start location 201. Accordingly, the measure 234b and measure 244 may be useful in determining whether to allocate the vehicle resource 224 to that vehicle request.

In some embodiments, a representation of a geographical area such as that depicted in FIG. 2a and FIG. 2b may be represented in one or more user interfaces (e.g., a displayed map for visualizing locations of vehicles, locations associated with vehicle requests, and/or locations of requesters) for using and/or administering a vehicle resource allocation system.

As discussed in this disclosure, various embodiments of the present invention provide for allocating vehicle resources for future vehicle requirements. FIG. 3 depicts an example allocation process 300 that may be performed, for example, by the vehicle resource allocation module 15 and/or by the job allocation module 105 (discussed below with respect to an example private hire booking service).

Figure 3:
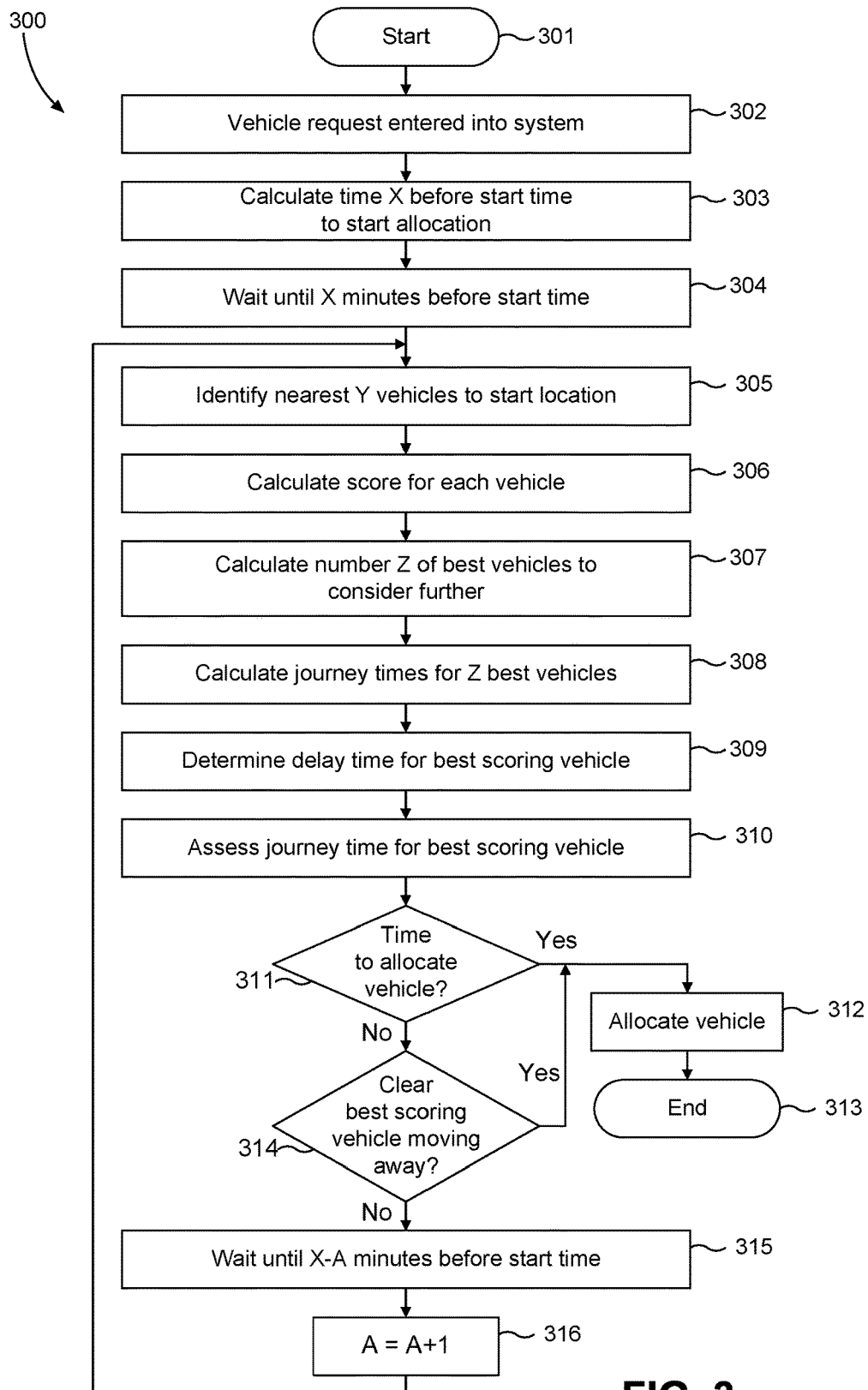
FIG. 3 is a flow chart illustrating an example operation of a system for allocating a vehicle resource of a dynamically determined set of candidate resource vehicles, according to various aspects of the present invention.

Referring to FIG. 3, the operation starts at step 301.

At step 302, a vehicle request entered into a vehicle resource allocation system. One example of entering a vehicle request is described, in the example context of a private hire booking service, with respect to step 602 of FIG. 6. The vehicle request (e.g., a request for a service vehicle, a request for an autonomous (unmanned) aerial or land-based drone vehicle) constitutes a vehicle requirement. In one embodiment, vehicles in a fleet of vehicles (e.g., police vehicles, military vehicles, freighter ships, taxi vehicles) constitute vehicle resources that can be allocated to a vehicle requirement constituted by a vehicle request (e.g., a request by a user of a requester device, a request by an administrator of a vehicle resource allocation system).

At step 303, the example process comprises calculating a value of time X for the vehicle request. The value of X indicates a time before a start time, associated with the vehicle request, at which to start the allocation process. The value of X may be determined based on one or more factors, as discussed below.

Advantageously, the value of X may depend, in some embodiments, on a start location associated with the vehicle request (e.g., a pickup location for a booking).

The value of X may depend, in one or more embodiments, on a priority associated with the vehicle request. In one embodiment, the priority may be based on a status or priority associated with a requester. In another example embodiment, the priority may be based on whether a requested booking is an account booking (relatively high priority) or a cash booking (relatively low priority). In another example embodiment, the value of X may depend on the identity of an account under which the vehicle request was made, with relatively high value accounts having a higher priority than relatively low value accounts.

According to some embodiments, the value of X may depend on a zone in which the start location (e.g., start location 201 of FIG. 2a) is present. A relatively low value of X may be used, for example, for zones in which a high concentration of fleet vehicles usually is present, an intermediate value of X may be used for zones in which an intermediate concentration of fleet vehicles usually is present, and a high value of X may be used for zones in which a low concentration of fleet vehicles usually is present.

By way of example, in London, a value of X=15 is considered to be suitable for pickup locations for bookings in central zones, for instance zones having postcodes starting with SE1, SE11, SE17, SW1, SW4, SW8, WC1, WC2, EC1, EC2, EC4, N1, W1, E1, E2 etc. A value of X=20 is considered to be suitable for intermediate zones, for instance zones having postcodes starting with SW6, SE8, N6 etc. A value of X=30 is considered to be suitable for pickup locations in outer zones, for instance zones having postcodes starting with SE6, SW20, TW10, HA9 etc. A value of X=60 is considered to be suitable for pickup locations in zones outside but surrounding London, for instance zones having postcodes starting with RH3, SG13, KT15. The value of X may be as high as 300 for pickup locations that are remote from London.

The value of X may vary for different zones depending on the priority of the booking. For instance, in London a value of X=25 is considered to be suitable for low priority (cash) bookings with pickup locations in zones having postcodes starting with SE21, SE26, Sw16 and SW13 but a value of X=30 is considered to be suitable for high priority (account) bookings in the same zones.

Alternatively, or in addition, the value of X could be fixed, or could be dynamically set by an operator and/or controller of an allocation system (e.g., system 10, system 100). A fixed or set value may be independent, in some embodiments, of the start location and/or an associated priority. In one example, a fixed or set value of X may be between 10 and 30 minutes and for instance the value of X may be 20. In this case, the allocation process starts 20 minutes before the scheduled start time (e.g., expected arrival of a transport vehicle, a pickup time).

A relatively low value of X means that a process does not start to allocate a specific vehicle to a vehicle request until relatively soon before the vehicle request start time. This equates to a lower amount of processing that is required to allocate a vehicle if there are multiple vehicles that could fulfil a vehicle request whilst allowing the best vehicle to fulfil the request.

Because, in some embodiments, a low value of X is applied in zones that typically have a high concentration of vehicles, this provides advantages of commencing allocation at a time when a number of vehicles may be able to satisfy the vehicle request, and so allows more options for allocating the best vehicle for the request.

A relatively high value of X means that a process starts to allocate a specific vehicle to a vehicle request a relatively long time before the vehicle request start time. This provides a greater possibility to identify a vehicle to fulfil the request without arriving late for the request, and is particularly useful where the vehicle may have a significant distance to travel to the requested location (e.g., as a result of the relatively low vehicle density).

Because, in some embodiments, a relatively high value of X is applied in zones that typically have a low density/concentration of vehicles, this provides advantages of commencing vehicle allocation at a time when a number of vehicles may be able to satisfy the request and so allows more options for allocating the best vehicle for the request. This effect is advantageous also for high value customers, for which a higher priority may be accorded.

At step 304, the process waits until X minutes before the start time for the vehicle request. This results in the allocation process being commenced an appropriate time before the start time (e.g., on the correct date).

At step 305, the example allocation process identifies the Y vehicles that are nearest to the start location for the vehicle request (e.g., a customer pickup location). The value of Y may be any number as desired for a particular implementation. In one example, Y may be between 10 and 100, and may for instance be 40.

In some embodiments, the vehicles are determined to be nearest if they have shortest crow fly distance between their current location (e.g., their last reported location, where vehicle locations may be reported periodically, such as every 30 seconds) and the location of the requested start location. The distance may be calculated, for example, as the straight line distance between the latitude and longitude coordinates of the location of the vehicle and the start location corresponding to the vehicle request.

In some embodiments, the process may provide for selecting, in step 305 all vehicles with an active status, e.g., 'available', 'going home', 'POB', 'drop in 5' or 'drop in 10.' Vehicles that have a status indicating an inactive status, e.g., 'off shift', 'allocated' (to a request), 'disabled,' 'unavailable,' or 'on break' (the driver is on a break) are not considered for selection. The result is a pool of candidate vehicles for the vehicle request. The number of candidate vehicles typically is a much smaller number than the number of vehicles in the fleet that have one of the relevant statuses.

The use of crow fly distances in step 305 results, in accordance with some embodiments, in an appropriate number of vehicles being selected for possible allocation to the job but without requiring the processing needed to calculate road routes and road distances for each of the vehicles. The calculation of crow fly distances is computationally non-intensive compared to road distance formulation.

At step 306, a score is calculated for the vehicle/request combination for each of the pool of candidate vehicles, i.e. the vehicles that were identified in step 305. A score may be calculated, in some embodiments, as described with reference to example method 400 of FIG. 4. The result is a numerical value that is an indication of the suitability of the vehicle for the request. Put another way, the result is a metric of the suitability of the vehicle for the request.

At step 307, the process may comprise calculating a number Z of vehicles for which to calculate journey times. This may be performed in any suitable way.

In some embodiments, an allocation module calculates the value of Z to be the number of vehicles whose score calculated at step 306 falls below a threshold value (if a low score is better) or exceeds a threshold value (if a higher score is better). The threshold may be an absolute amount, for instance 100. Alternatively, the threshold may be related to the score of the best scoring vehicle. Where a low score is better, the threshold may be calculated as a multiple of the score of the best scoring vehicle and where a high score is better the threshold may be calculated as a fraction of the score of the best scoring vehicle. For instance, if the multiple is 3 and the best scoring vehicle has a score of 20, the threshold is set at 60. Alternatively, the threshold may be set at a predetermined distance from the best scoring vehicle. For instance, if the predetermined distance is 40 and the best scoring vehicle has a score of 20, the threshold is set at 60. The value of Z is capped at a maximum proportion (for instance 25%) of the value of Y.

In some other embodiments, step 307 involves looking up a value of a setting that is stored in the system. The value of the setting may be set manually or automatically, and may be any value suitable for a desired implementation. In one example, the value may be 1. Advantageously, the setting may be between 3 and 10.

In still further embodiments, the value of Z may be set as a predetermined proportion of the value of Y. For instance, the value of Z may be set at 0.1 times, 0.2 times or 0.3 times the value of Y.

However it is calculated, the value of Z is lower than the value of Y. As such, road distance calculation is not performed for all of the Y vehicles that were determined to be closest to the start location at step 305.

At step 308, a journey time for each of the Z best scoring vehicles is calculated. The Z best scoring vehicles are the vehicles whose scores are better than the other vehicles that were scored at step 306. The journey time for a vehicle is the journey time from an associated vehicle location (e.g., its current location) to the start location associated with the request. For example, the journey time for the example vehicle resource 223 in FIG. 2a is the journey time from the vehicle location 223a to the start location 201.

The journey time for each of the Z best scoring vehicles may be calculated at step 308 by an allocation module (e.g., vehicle resource allocation module 15, job allocation module 105) or it may alternatively be calculated by vehicle resource allocation core system 12 and/or the core system 101. The journey time is calculated by predicting journey times for a small number of the most direct routes between the vehicle location and the start location (e.g., a police destination, a pickup address), and choosing the shortest journey time. If one route can be determined to be the best route, then the journey time for that route is taken as the journey time between the vehicle location and the start location. Alternatively, the journey with the smallest time cost may be identified and used to determine the journey time.

In some embodiments, the vehicle location association with a vehicle, for purposes of determining a journey time, may be an expected final destination for a request currently being (or to be) fulfilled by the vehicle, rather than the vehicle's current location. For example, for vehicles currently fulfilling a previously-allocated booking (e.g., that have the status 'drop in 5' 'drop in 10' or 'POB'), the journey time is calculated from the destination or final location of the request being fulfilled, rather than the vehicle's current location.

According to some embodiments, the prediction of journey times may use actual or estimated averages of transit times of segments of the journey (e.g., stored in the location database 18 and/or map and location database 109) added together to produce a journey time for the required journey. In the simplest embodiments, the segment transit times are estimated from known speed limits (maximum permitted speeds) and junction counts (numbers of traffic lights, give way junctions etc.) in the segments. In other embodiments, historical averages may be stored in one or more databases (e.g., location database 18, the map and location database 109, or historical database 132) and are used in the journey time calculation.

In the most sophisticated embodiments, historical averages for different times of day and different types of day (weekday versus Saturday versus Sunday) are accessed from data storage or otherwise received and used in the journey time calculation. The more sophisticated embodiments typically require more data to be collected, processed and stored (e.g., in the location database 18, in the map and location database 109). However, they provide more accurate journey time calculations, in particular by taking into account issues such as weekday rush hour traffic conditions and generally taking into account local traffic volume and flow patterns. However it is performed, the calculation of a journey time is a relatively computing resource intensive step in part because it requires identification of one or more best routes between two locations.

In some embodiments, calculating a journey time at step 308 may comprise calculating a late score for each of the Z best vehicles. Calculating a late score may comprise determining how late a vehicle would be if it were allocated to the vehicle resource at the current time, and assigning a corresponding late score. In some embodiments, calculating a late score takes into account the calculated journey time and the time remaining before the start time of the request. This may or may not take into account an allocation buffer, which is discussed below. In one or more embodiments, if any of the vehicles scores a non-zero late score, this is taken into account in the overall score for the vehicles and may change which vehicle is the best scoring vehicle for the request. One example process for determining a late score is described with reference to FIG. 4.

In one or more embodiments, at step 309, an allocation buffer value (also referred to as a 'delay time') is calculated for the best scoring vehicle. The allocation buffer provides a margin or cushion for the vehicle to arrive at the start location at the start time. The value of the allocation buffer may be calculated in any suitable way.

The allocation buffer value calculated in step 309 may for instance be calculated using a predetermined margin or a predetermined multiplier. A larger allocation buffer value may be calculated for higher priority vehicle requests, for instance requests for emergency or police services, or for bookings originating from high value customers.

The allocation buffer value may be calculated, in one example, as the calculated journey time multiplied by a predetermined factor, which may have a value between 0.2 and 0.5 and most advantageously is between 0.3 and 0.4. Alternatively, the allocation buffer may be independent of the time remaining to the start time or the calculated journey time. It may be a fixed value, for example with a value between 1 and 3 minutes. The value may instead be calculated as the sum of a number of values which are set on a zone basis, e.g. each zone is allocated a value (which may vary according to the time of day and the day of the week) and the allocation buffer is the sum of the values for the zones through which the vehicle would need to travel to reach the start location.

The allocation buffer value may, in some embodiments, additionally include an element that derives from the status of the vehicle. For instance, an additional amount may be added for vehicles currently fulfilling another request (e.g., with the status 'drop in 5' (for instance an additional 5 minutes), 'drop in 10' (10 minutes) and 'POB' (estimated time remaining until the vehicle reaches its drop-off location)).

According to some embodiments, at step 310, the process provides for assessing the journey time for the best scoring vehicle, in particular to assess whether the vehicle needs to start the journey to the start location in order to arrive there at the start time. The assessment involves, in one embodiment, the following calculation:

Optimum time to leaving=requested start time−(journey time+allocation buffer)

Where:

optimum time to leaving is the time of day that would be optimum for the vehicle to start the journey to the start location, requested start time is the start time for the vehicle request (e.g., a pickup time for a booking), journey time is the journey time value calculated for the best scoring vehicle at step 308, and allocation buffer is the allocation buffer value calculated for the best scoring vehicle at step 309.

The difference in time between the current time and the optimum time for leaving is then calculated and the result is compared to a threshold. The result of the comparison of the value to the threshold is used in the next step to determine whether it is time to allocate the vehicle to the booking.

The use of an allocation buffer value in the calculation increases the chances that, on average, vehicles will arrive to fulfil requests on time whilst minimising the chances that vehicles will arrive too early and thus be a non-utilized resource whilst waiting for the start time.

At step 311, it is determined whether the current time is the time to allocate a vehicle to the vehicle request. The threshold mentioned above in relation to step 310 may for instance be 1 (1 minute) or zero. If it is calculated at step 311 that the difference in time between the current time and the optimum time for leaving is less than the threshold, then a positive determination is made. This indicates that the vehicle needs to start now (or within the next minute) their journey to the start location in order to arrive in time (having regard to the allocation buffer value).

On detecting at step 311 that it is time to allocate a vehicle to the request, the best scoring vehicle is allocated to the request at step 312 before the operation ends at step 313.

If it is detected at 311 that it is not time to allocate the vehicle, the operation continues to step 314. Here, it is determined whether there is a clear best scoring vehicle and if so whether that vehicle is moving away from the start location. A 'clear best scoring vehicle' is one that has a score that is significantly better than (e.g., a threshold amount away from or multiple/fraction of) the score of the next best scoring vehicle. A determination as to whether it is moving away is made by comparing the road distance from the vehicle to the start location to a previously calculated road distance, or by comparing the calculated journey time to the last calculated journey time. On making a determination that the best scoring vehicle is moving away from the start location, the operation proceeds to allocate the best scoring vehicle to the request at step 312.

In one or more embodiments, step 310 may be dependent on other conditions being present, for instance relating to the time remaining to the start time of the vehicle request and the journey time to the start location.

By making the assessment at step 310 in respect of the best scoring vehicle, it is the vehicle that is best suited to the vehicle request that is determined to be required to be allocated to the request, even if that vehicle is not the vehicle that is closest to the requested start location or has the shortest journey to the start location. This allows the optimisation of the allocation of fleet vehicles to vehicle requests, and it allows it to be achieved in an intelligent way. For example, the vehicle resource 224 may be the best scoring vehicle for the example request to start location 201 described with respect to FIG. 2b, even if vehicle resource 224 currently has a destination location, and the vehicle resource 221 currently has the shortest journey to the start location. Additionally, it allows, with respect to some embodiments, modification of the way in which vehicles are selected for fulfilling vehicle requests through adjustment only of a cost scoring process (e.g., the example scoring process 400 of FIG. 4), and does not require adjustment of the allocation process.

In one or more embodiments, after step 314, at step 315 the process comprises waiting until X−A minutes before the start time. The value of A may be initialised, for example, at 1 when the operation began at step 301, so on first performance of step 315 the operation waits until X−1 minutes before the start time of the booking. Once this time has been reached, the value of A is incremented at step 316 and the operation returns to step 305, where the nearest Y vehicles to the start location are identified. An effect of steps 315 and 316, and the return to step 305, is that nearest vehicles are identified and scored once every minute (or after another desired or predetermined time increment), until a vehicle is allocated.

On subsequent execution of step 305, vehicles that no longer have one of the relevant statuses (e.g., 'POB', 'available', 'drop in 5' or 'drop in 10') may not be identified as candidate vehicles and may not be scored at step 306.

On subsequent performance of step 306 in relation to a given request, many of the same vehicles may be scored but they may score differently than the last occasion on which they were scored. For example, the same vehicle resources depicted FIGS. 2a and 2b may score differently as of the later time represented in FIG. 2b than when they were scored as of the time represented in FIG. 2a. Vehicles will score worse (with a higher score) in some instances, for instance if they have moved away from the start location by a significant distance (e.g., as vehicle resource 223 moved away from start location 201 as depicted in FIG. 2a and FIG. 2b). Vehicles will score better (with a lower score) in some instances, for instance if the status of the vehicle has changed from a previously-allocated status (e.g., 'drop in 5') to a status indicating current availability (e.g., 'available'). In one example, the status of vehicle resource 221 changed between the times represented in FIG. 2a and FIG. 2b from a previously-allocated status (assigned to destination location 211) to being available for the example request to start location 201. Also, wait times necessarily will be longer and so the wait time score (which is negative) may reduce the total score for many vehicles. As such, on subsequent performance of step 307, different vehicles may be in the Z best vehicles and a different vehicle may be the best scoring vehicle. In that case, it is a different vehicle for which the journey time to the start location needs to be calculated so that it can be determined at step 311 if it is time to allocate the vehicle to the request.

Whether or not different vehicles form the pool of Z best vehicles are identified on subsequent execution of step 307, or Z has a different value, the calculation of the journey times is made again for the Z vehicles at step 308. If the journey time for the best scoring vehicle has already been calculated for the same or a very similar location of any of the Z best scoring vehicles (which occurs when the vehicle is stationary or has not moved significantly), step 307 may, in some embodiments, use the previously calculated journey time instead of calculating the journey time again. In one embodiment, a journey time for a vehicle may be taken from a journey time calculated for a different vehicle either currently or very recently if there is a substantial match in vehicle locations.

Whether or not a different vehicle is the best scoring vehicle on subsequent execution of step 306, at step 311 it is determined whether it is time to allocate the vehicle to the request, based on the journey time to the start location and the time remaining to the start time for the request, etc. Since step 311 necessarily is performed at a later time than previous performance of the step (1 minute later in this example), it may on the latest performance of step 311 be determined that it is time to allocate the vehicle even if the best scoring vehicle has not moved, in particular when time has elapsed such that the vehicle needs to start its journey to arrive at the start location on time. Once it is determined that it is time to allocate the vehicle, the best scoring vehicle is allocated to the booking at step 312. This is the case regardless of whether it is predicted that the vehicle could arrive at the start location on or before the start time.

The vehicle that is allocated to the booking at step 312 will, by virtue of the scoring operation (at 306), be the vehicle that is best suited to the request. It may be that the circumstances are such that the vehicle will be allocated at a time when it could arrive late at the start location. This may occur for instance if the best vehicle changed status from an unavailable status (e.g., 'on break' or 'off shift') to an available status (e.g., 'available') at a late stage in the allocation process or if there is a severe shortage of vehicles near the start location for the request. However, the inclusion of the allocation buffer means that the vehicle may not arrive late.

In accordance with some embodiments, the configuration of a vehicle resource allocation module to allocate a vehicle to a vehicle request at the last minute (even though the request may be a future vehicle request that was entered much earlier), or 'just in time', increases the flexibility of allocation of vehicle resources of a fleet. It also contributes to reducing the overall mileage that is traveled by the vehicles of the fleet in order to satisfy the requests that are received by a vehicle resource allocation system (e.g., system 10, vehicle resource allocation core system 12, system 100). In the absence of the dynamic and flexible allocation provided by the technical improvements to managing a dynamic system of vehicle resources and other mobile objects, as described above and in this disclosure, vehicles would be allocated to requests less optimally, resulting in an increased overall distance traveled of the vehicles of the fleet. Reduced distance traveled equates to lower fuel consumption leading to lower carbon emissions, lower vehicle wear and tear, lower chance of accidents, lower driver fatigue, and generally lower costs.

The use of crow fly (direct) distance calculation, in accordance with some embodiments, in selecting candidate vehicles whilst using calculated journey times in determining the best vehicle from the pool of candidate vehicles minimises system resource use whilst providing effective allocation because it requires relatively little journey time calculation.

It will be appreciated from the above that steps 305 to 311 may be repeated until a vehicle is allocated to the request. The number of times that the steps are repeated depends, for example, on the initial value of X, which dictates how long before the start time of the booking the allocation process 300 of FIG. 3 begins, and the number of minutes before the start time that the vehicle is allocated to the request.

For requests in areas where there are relatively large numbers of vehicles and journey times to potential start locations may be short (e.g., for bookings in central city locations), requests may be allocated only a small number of minutes, for instance 2, 3 or 4 minutes, before start times. For requests in other locations, where there may be relatively few vehicles and a low vehicle density, requests may be allocated significantly longer before the start time for the request, for instance 12, 15 or 18 minutes before the start time. For requests with start locations where there are no vehicles, so a vehicle needs to travel a long distance, requests may be allocated many minutes, potentially a number of hours, before the start time.

In some embodiments, by selecting corresponding values of X for different zones, the allocation process 300 of FIG. 3 will typically run for approximately the same period of time across the fleet at any given time. During busy periods or during periods when there is a relatively high number of active vehicles, requests may be allocated closer to the start times of requests and so the allocation process may run for longer.

For vehicle fleets with relatively low vehicle densities, having regard to the covered geographical area, a higher value of X may be appropriate in some implementations. Advantageously, the value of X, which indicates the number of minutes prior to the start time that the allocation process begins, may be set by an administrator of the system. The value of X may be settable by an administrator on a per zone basis. A global setting may also be applied, by which the value of X is altered for all zones by a given amount or factor.

In some embodiments, the scores of vehicles in pre-allocation processes for other requests are taken into account when allocating a vehicle to a request. In particular, before allocating the best scoring vehicle to a request, the process (e.g., as executed by an allocation module) determines how the vehicle ranks in other requests for which vehicles are being scored but which have not yet had a vehicle allocated to them. If a vehicle is the best scoring vehicle against a first request but is the best scoring vehicle against a second request by a larger margin, the vehicle may be allocated to the second request even if at the current time the vehicle would be allocated to the first request so as to arrive at the start location on time to fulfil the request. This may be achieved by allocating the vehicle to the second request or by applying a penalty score for the vehicle against the first request such that it ceases to be the best scoring vehicle against that first request.

An example method 400 of scoring a vehicle against a vehicle request, such as requested booking of a private hire vehicle, will now be described with reference to FIG. 4. The scoring process 400 of FIG. 4 may be performed, for example, by the vehicle resource allocation module 15 and/or the job allocation module 105.

Figure 4:
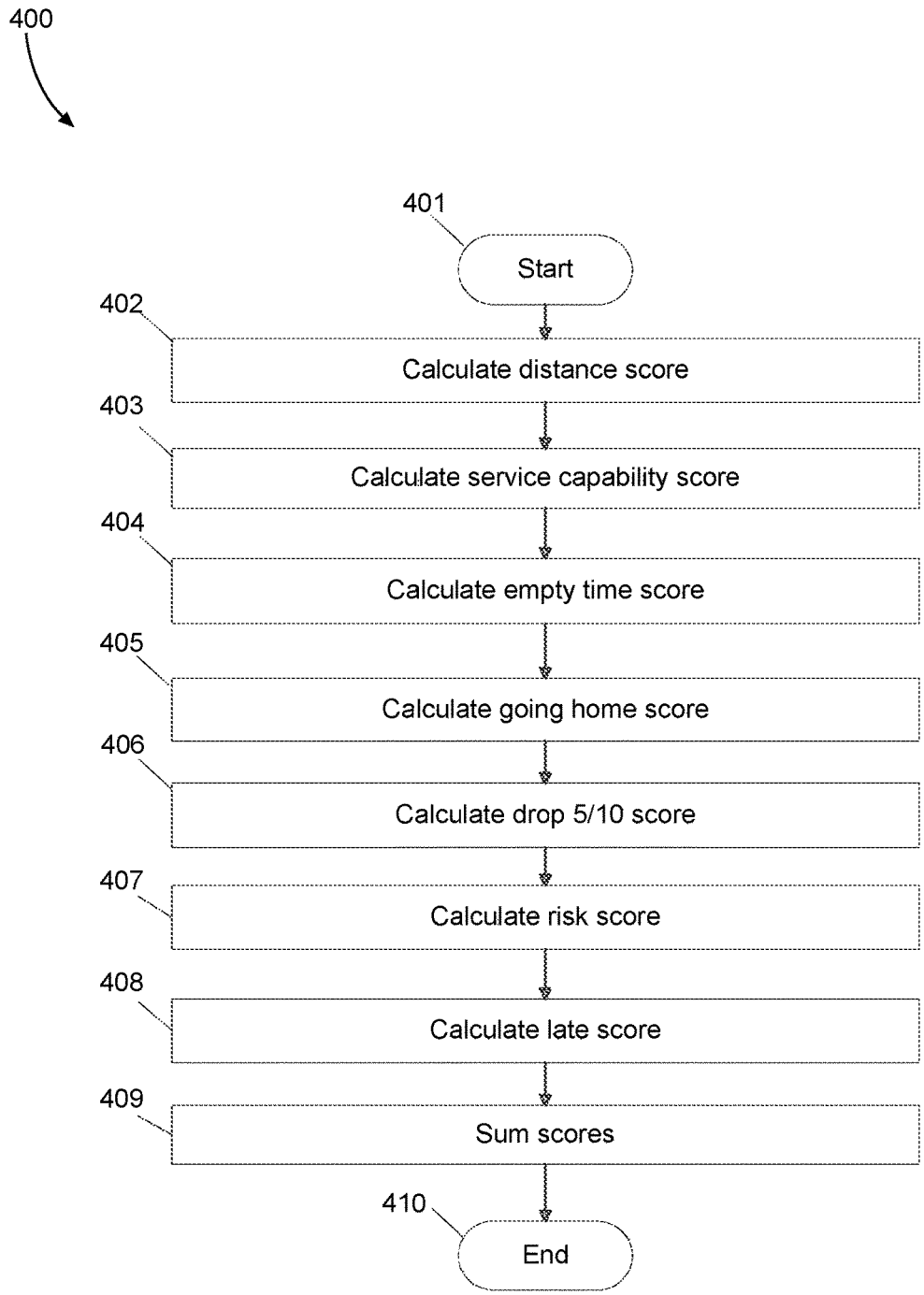
FIG. 4 is a flow chart illustrating calculating a score for a vehicle resource with respect to a vehicle request.

Although the example method 400 of FIG. 4 describes a plurality of various types of sub scores and a total or composite score, it is contemplated that scoring a vehicle with respect to a vehicle request may comprise determining a score based on one or more of the described types of sub scores, and in any combination, as seemed suitable for a desired implementation of an allocation process. For example, a scoring process for use in allocating a vehicle for a future vehicle requirement (as described with respect to FIG. 3) may comprise calculating one or more of: a distance score, a service capability score, and/or a late score. Accordingly, while various example types of sub scores and corresponding composite scores are discussed with respect to FIG. 4 (some of which are particularly applicable to the context of private hire bookings and/or vehicles having drivers), it will be understood that sub scores and total scores may be calculated for other types of vehicle resources (manned and/or autonomous or unmanned) and other types of vehicle requests.

The operation starts at step 401. In brief, different scores are calculated at steps 402 to 408, and at step 409 the scores are summed together. Clearly, it will be appreciated that the example scores may be calculated in any order, that not all of the scores described must necessarily be calculated, and that the scores may be calculated wholly or partly in parallel.

At step 402, a distance score is calculated. The distance score allows the distance between a vehicle and the start location of a vehicle request (e.g., the pickup location of a booking) to be taken into account when scoring the vehicle against the request. The distance score is calculated as the distance between the current position of the vehicle and the start location (e.g., delivery address, traffic enforcement location, customer pickup address). The distance has the unit of miles, but it may alternatively be kilometers, or any desired measure of distance. The distance is calculated as the distance that will need to be traveled by the vehicle to reach the start location, taking into account road layout, one way streets, etc. This is known as the road distance. The shortest route from the vehicle to the start location is used for the distance location, even if this is not the quickest route. The route and the road distance thereof are calculated, for example, using information from the vehicle resource database 14, the location database 18, and/or the historical database 132. Preferably, it is the last recorded position of the vehicle that is used in the distance score calculation.

An administrator or other operator of an allocation system (e.g., system 10, vehicle resource allocation core system 12, core system 101, system 100) may apply a setting such that the distance score is always zero, in which case the distance between the vehicle and the start location is not taken into account in the score calculation.

At step 403, a service compatibility score is calculated. The service compatibility score results in the taking into account of the car type preference or other vehicle resource type preference that was specified in a request, against the type of the vehicle that is being scored. If the type of vehicle that is being costed is the same type as that is specified in the request, or is consistent with that type, then the service compatibility score is zero. The service compatibility score takes a positive value if there is incompatibility between the service type of the request and the type of vehicle that is being scored. In the case of the request specifying a VIP or large vehicle, and the vehicle being scored being a standard vehicle, a penalty of 500, for example, may be provided as the service compatibility score. A penalty helps to ensure that a specific type (e.g., VIP vehicle) will be provided to fulfil a request if one is available, but if not then a different type of vehicle (e.g., a standard car) can be provided.

In the case of a booking, in another example, specifying a standard four passenger vehicle, a penalty score of 50 points may be provided for a vehicle that is a seven-seater vehicle. This helps in ensuring that the booking is serviced with a suitable car, but also contributes to avoiding the removal of a large capacity vehicle from the pool of available vehicles unnecessarily.

In another example, in the case of a booking being for a standard car and the vehicle type being a VIP car, a penalty score of 100 may be provided. Similarly to the situation described in relation to the larger capacity vehicle, this helps to ensure that the booking is satisfied whilst not removing VIP vehicles from the available fleet unnecessarily.

At step 404, an empty time score is calculated. The empty time score allows the utilisation of the vehicle (and/or a corresponding driver) to be taken into account in the scoring of the vehicle in relation to the vehicle request.

The empty time score is calculated, in one example, as the product of −1 and the time (in minutes or other desired unit of time measure) since the last request allocated to the vehicle (e.g., or car/driver combination) was completed and a cost per empty minute. The cost per empty minute is in effect a weighting factor. The weighting factor may be set by an administrator of a vehicle resource allocation system. For a vehicle that is currently fulfilling a request (e.g., a taxi in the state 'POB') the empty time score preferably is zero.

The inclusion of an empty time score in the operation of method 400 helps to provide load balancing of the vehicles, and (where applicable) load balancing of the drivers. Vehicle load balancing helps to even out wear and tear on different vehicles in the fleet on a unit time basis. Load balancing of drivers is useful because it helps to prevent the likelihood of drivers performing too many consecutive jobs with insufficient breaks in between the jobs, and it also helps to reduce the likelihood that drivers will wait for long periods between jobs. Load balancing of drivers, through use of the empty time score in the costing operation, helps to prevent driver fatigue and thus improves safety.

At step 405, a going home score is calculated (e.g., where a drive is associated with a vehicle resource). In one example, if the status of a driver is 'going home', then a score is calculated. If the driver has some other state, then the going home score is zero.

If the driver's status is 'going home', the going home score is calculated as the product of −1 and the number of saved miles and a distance criteria. The saved miles component of the score provides a measure of how much closer to their home the driver would be if they fulfilled this request. The saved miles component is calculated as the current distance to home (which is the road distance from the current location of the vehicle to the driver's home address) minus the distance between the start location or other subsequent requested location for a request (e.g., a drop-off address) and home (which is the road distance from the last location of the request to the driver's home address). The distance criteria provides a weighting, and may be set by an administrator of the system.

The effect of the inclusion of the going home score is to increase the likelihood that a job will be allocated to a driver who is on the way to their home (for instance for a lunch break or having finished their shift) if the job would take the driver to a location that is nearer to their home. The magnitude of the score depends on the distance that would be saved, so a score is obtained if the last requested location is relatively closer to the driver's home address.

At step 406, a drop 5/10 score (also referred to as a 'time to availability' score) is calculated. For vehicles or drivers that have an associated status indicating the vehicle is currently fulfilling a vehicle request but will be available relatively soon for allocation to a new request (e.g., 'drop in 5' or a 'drop in 10' status), the drop 5/10 score has a positive value. For vehicles or drivers that do not have such a status, that is for vehicles that are not currently fulfilling a request, the time to availability score is zero. The status of the vehicle may be set by a driver, in accordance with some embodiments, through their driver's device 110 or vehicle resource device 22a. In particular, when the driver's device 110 calculates, for example, that there are fewer than 10 minutes remaining in the journey to a drop-off address, the driver's device 110 provides an option to the user to adopt the 'drop in 10' status. If the driver selects this option on the driver's device 110 (when the vehicle is stationary), the 'drop in 10' status is entered. Similarly, when the driver's device 110 detects that there are fewer than five minutes remaining in the journey to the drop-off location, the driver's device 110 provides an option to allow the driver to select entering the 'drop in 5' status.

If the driver of the vehicle has a 'drop in 5' status, a score of 20 points is calculated, for example. If the driver has the 'drop in 10' status, a score of 30 points is calculated, for example. Other score values may be deemed appropriate for other types of statuses and expected times to availability.

The calculation of a time to availability score allows vehicles that have a request in progress (e.g., have a POB status) to be considered for allocation to another request. However, a penalty is applied to them with the result that they are less favoured than vehicles that are currently empty. This provides protection against the vehicle arriving late for the request if, for example, there are unexpected delays in the previous journey.

At step 407, if the status of the vehicle indicates that the vehicle is currently fulfilling a booking or other type of vehicle request (e.g., the vehicle has an associated status of 'POB', 'drop in 5' or 'drop in 10'), a risk score is calculated. In brief, the inclusion of the risk score allows vehicles that are not currently available to be allocated to a request to be considered for a new vehicle request whilst taking into account the risk that they will not be able to fulfil the new vehicle request.

In some embodiments, the risk score may be calculated according to:

$$\text{Risk Score} = \text{POB penalty} + \text{POB risk penalty} * \text{risk}$$

where $$\text{risk} = \text{home risk} + (1 - \text{home risk}) * \text{shift end risk}$$

where
  home risk = base home risk/100;
  base home risk =
    0, if distance to home > 6;
    50, if 3 < distance to home < 6;
    1000, if distance to home < 3;
  shift end risk = base shift end risk/100;
and where:

$$\text{Base shift end risk} = \text{current time} - \text{driver shift start time}$$

Thus, the value of base shift end risk is a measure of the period of time elapsed since the driver started the current shift. The value increases, giving rise to a higher value of the risk score, as the shift length increases.

The value of the base home risk parameter varies according to the distance to the driver's home from the final location of the request currently being fulfilled (e.g., a drop-off location). It is banded such that it may take one of only a predetermined number of values, in this case 3. If the distance to the driver's home is low, the value of the base home risk is relatively high, and vice versa.

In some embodiments, the value of the shift end risk parameter may be derived from a look up table in which bands are stored. The look up table may for instance take the following form:

| Duration | Base shift end risk |
|---|---|
| 0-2 | 20 |
| 2-3 | 25 |
| 3-4 | 30 |
| 4-5 | 40 |
| 5-6 | 50 |
| 6-7 | 60 |
| 7-10 | 80 |
| >10 | 90 |

According to this non-limiting example look up table, a shift length of 2.6 hours provides a base shift end risk value of 25, and a shift length of 4.6 hours provides a base shift end risk value of 40.

In general terms, the risk score is a function of the distance between the final location of the request currently being fulfilled and the home address of the driver of the vehicle. It is a function also of the time since the driver of the vehicle started their shift. The risk score is a measure of the likelihood that the driver will end their shift and go home after they have completed fulfilling their current request.

At step 408, a late score is calculated. In brief, the inclusion of the late score introduces a penalty for vehicles that it is calculated would be likely to arrive late at the start location.

The late time score is calculated according to the following:

Late Time Score=late time*late time weighting factor

Where the value of the late time parameter is the number of minutes after the start time for the vehicle request that the vehicle is predicted to arrive at the pickup location and the late time weighting factor is a configurable parameter that weights the contribution of the late time to the overall score for the vehicle/request combination.

In general terms, the late time score is a function of how late it is expected that a vehicle would be if it were allocated to a request at the current time.

As discussed in more detail with respect to the example process 300 of FIG. 3, the late score may not be calculated for every vehicle. Instead, in accordance with some embodiments, the late score may only be calculated for a relatively small number of vehicles.

At step 409, the scores calculated in steps 402 to 408 are summed, to provide a total score for the vehicle/request combination (or driver/vehicle/request combination, as desired). This score may be used, as described with respect to various embodiments in this disclosure, in one or more allocation processes (e.g., the method 300 shown in FIG. 3).

Figure 5A:
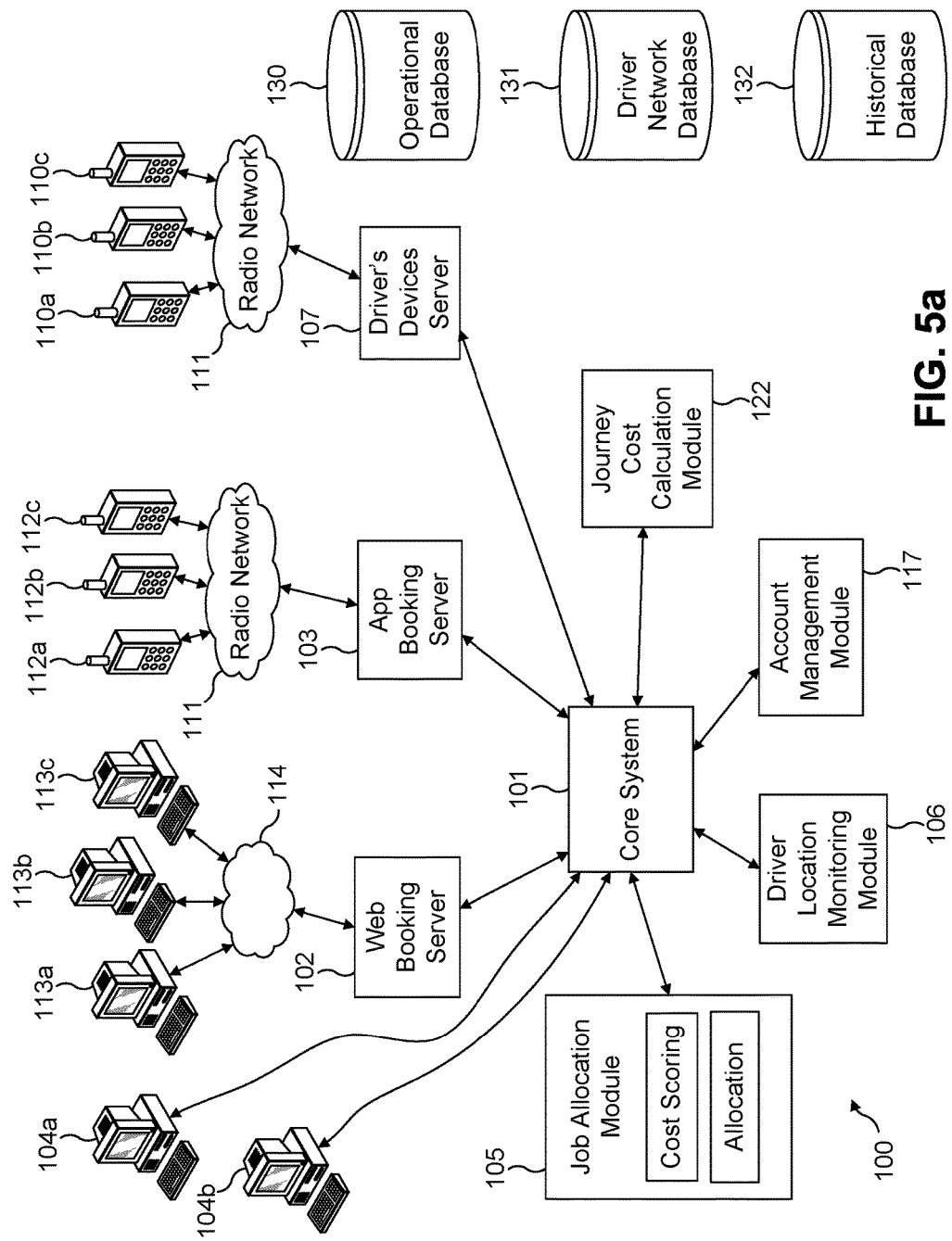
FIG. 5a is a schematic diagram of a system for management of a private hire vehicle service according to various aspects of the present invention.
Figure 5B:
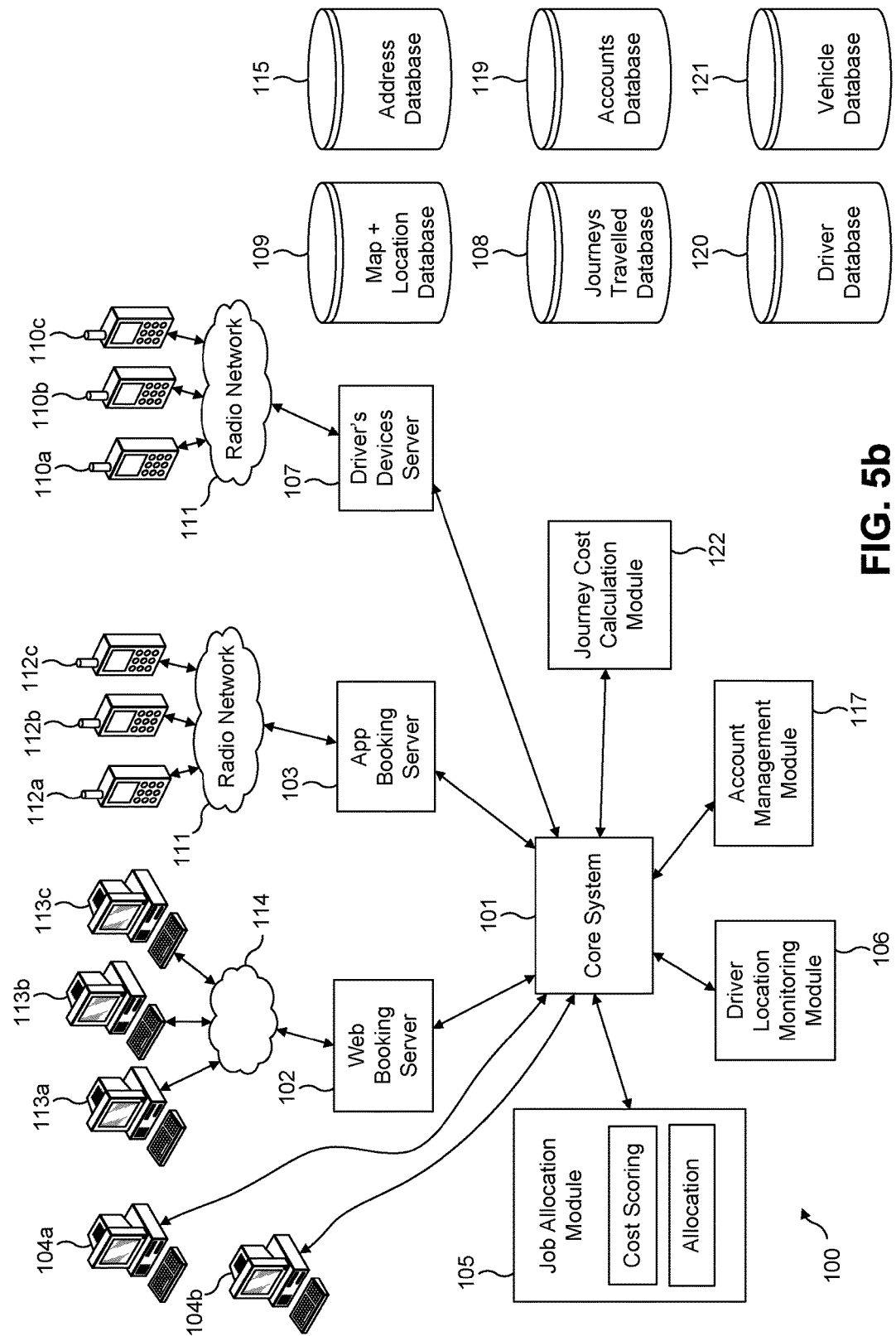
FIG. 5b is a schematic diagram of a system for management of a private hire vehicle service according to various aspects of the present invention.
Figure 6:
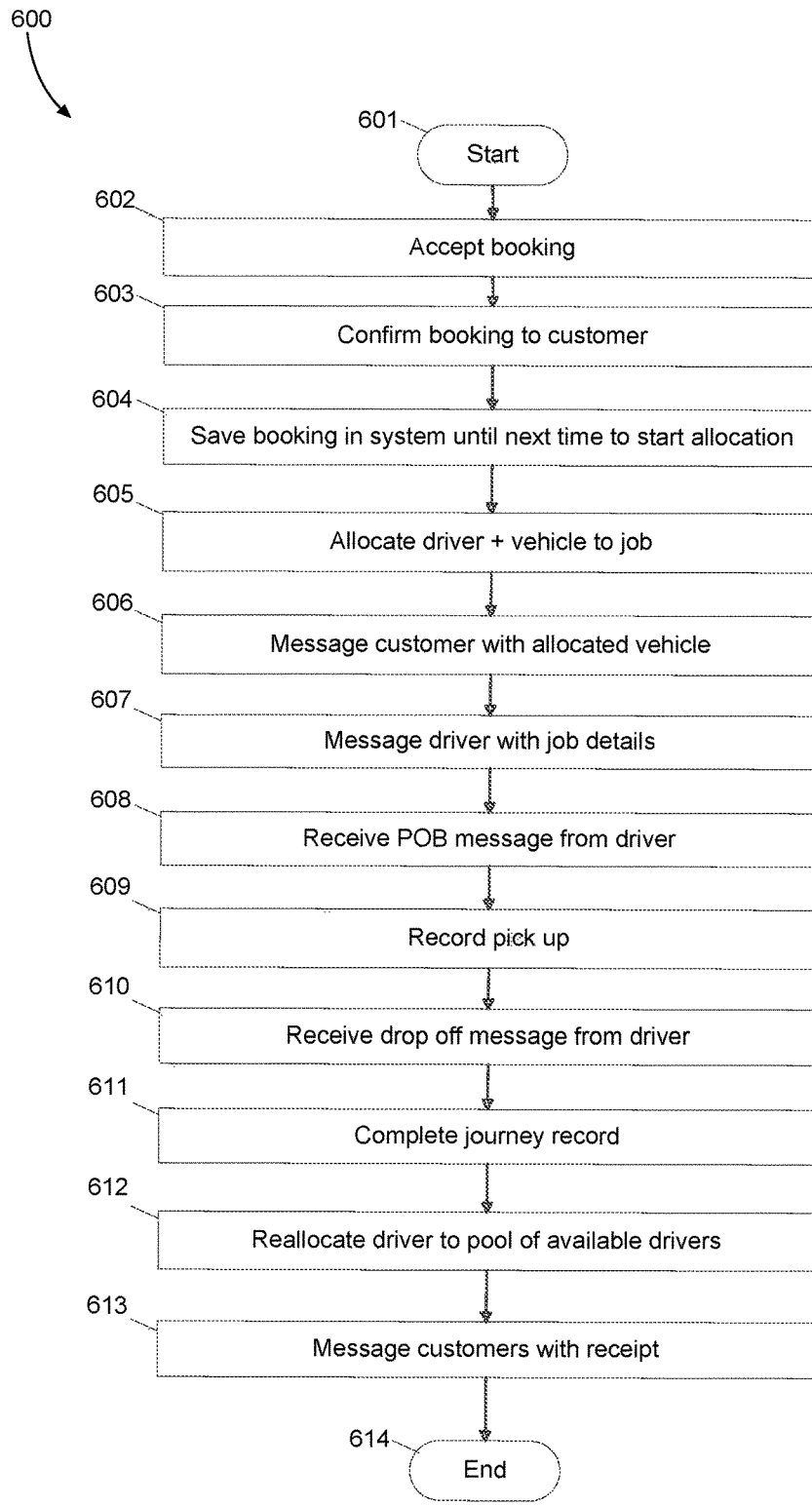
FIG. 6 is a flow chart illustrating overall operation of a system in fulfilling a booking through providing a private hire vehicle.

As discussed above, various types of vehicle resource allocation systems may provide for allocating different types of vehicles (e.g., police and security vehicle resources, remotely-operated aircraft) dynamically at particular times based on various timing factors, including journey times. FIGS. 5a, 5b, and 6 and the accompanying text below describe some additional details of managing vehicle resources, using an example and non-limiting context of a private hire vehicle service. According to some embodiments, as discussed further below with respect to FIG. 5a, FIG. 5b, and FIG. 6, vehicles in a fleet of private hire vehicles may constitute vehicle resources that can be allocated to a vehicle requirement constituted by a requested booking (e.g., having an associated customer pickup location and an associated drop-off location).

FIG. 5a is a schematic diagram of a system for management of a private hire vehicle service according to various aspects of the present invention.

The system 100 includes a number of interconnected components, as will now be described. The system 100 includes at its centre a core system 101. This comprises one or more server computers running system software that ensures smooth operation of the system 100.

Key functions of the system 100 are bookings, allocation of a private hire vehicle to a booking, vehicle and driver management, account management and record keeping.

The booking function is provided primarily by a web booking server 102, an application booking server 103 and call centre terminals 104A and 104B, all of which are coupled to the core system 101.

The allocation function is provided primarily by a job allocation module 105, with information from other parts of the system 100.

The system includes database functions. In particular, an operational database 130 stores records that relate to general operation of the system 100. A driver network database 131 stores records that relate to drivers and vehicles that are managed by the system 100. Lastly, a historical database 132 stores records that have been archived from the operational database 130. Archiving of records from the operational database 130 to the historical database 132 occurs periodically and only records that are no longer needed for general operational use are archived.

The vehicle and driver management function is provided primarily by a driver location monitoring module 106 and a driver's devices server 107, with reference to the driver network database 131 as well as other components of the system 100.

The account management function is provided primarily by an account management module 117, utilising accounts information stored in the operational database 130 along with other components of the system 100.

The operational database 130 stores details of every account held with the operator of the system 100. Each account is identified by an account number stored in the operational database 130. The accounts information stored in the operational database 130 may also include an account name, such as a company name and contact details for the company. The accounts information stored in the operational database 130 stores credit card details and/or other payment details so that payment can be taken from the account holder if permitted. A password and/or PIN (personal identification number) is associated with each account and stored with the accounts information in the operational database 130. Furthermore, a list of persons authorised to make bookings on the account may be stored, and optionally profiles for the individual authorised persons within the accounts.

The accounts information stored in the operational database 130 may also include a contact name and telephone number of a person who should be contacted in case of problems with the account. The accounts information stored in the operational database 130 includes information regarding invoicing preferences, for example the frequency of invoicing, date on which the invoice should be sent, the monthly/weekly credit limit and what information from each booking should be included on the invoice. The accounts information stored in the operational database 130 may indicate whether each account is active, or if it has been placed on hold. An account may be placed on hold by a credit control department and this may prevent further bookings being made on the account. Historical data of spending on the account may also be stored in the operational database 130, or this may be stored in the historical database 132.

The record keeping function is provided primarily by the historical database 132, although the operational database 130 and the driver network database 131 also provide some record keeping function.

In brief, a fleet of private hire vehicles is managed by the system 100. Each vehicle has a respective record in the driver network database 131, as will now be described.

The driver network database 131 stores information about every vehicle in the fleet. The registration number (license plate number) of each vehicle is stored in the driver network database 131. This may be used to identify each vehicle. Alternatively or in addition, a unique identifier separate from the registration number may be assigned to each vehicle as the primary means of identification within the driver network database 131.

Each Service is defined according to its vehicle type, capacity and other characteristics. In some embodiments, these types are "Up to 4 passengers", "Up to 7 passengers", "Electric vehicle", "VIP" and "Up to 4 passengers with luggage". The driver network database 131 stores the type of each vehicle and may also store a corresponding number or short string of characters which represents each type. Any special equipment such as a baby seat or the ability to accommodate a wheelchair is also identified in the driver network database 131. The driver network database 131 indicates the current driver to whom the car is assigned, although the driver/vehicle allocation changes from time to time.

The driver network database 131 stores the make and model and optionally the colour of each vehicle. The driver network database 131 also indicates the current status of the vehicle. In some embodiments, the status is chosen from "Driver Pool", meaning that the car is in use by a driver, "Free Pool", meaning that the car is not currently being used and is free to be allocated to a driver and "Workshop", meaning that the car is undergoing maintenance or repair. The driver network database 131 also stores the private hire license number (PCO) for each vehicle and the date on which this license expires as well as the road tax, vehicle insurance and MOT (vehicle roadworthiness certificate) expiry dates if appropriate. Examples of other data which may be stored are the date of purchase of the vehicle, the price paid for the vehicle, the date of manufacture, the supplier of the vehicle, warranty information and the date of the last inspection/maintenance.

Historic data about each vehicle may also be stored in the driver network database 131, such as a record of the previous registration numbers and a record of the previous drivers who were assigned to the vehicle. The service history and details of any accidents and repairs may also be stored.

The fleet of private hire vehicles is driven by a pool of drivers, each of which has a record in the driver network database 131.

The driver network database 131 stores information about each of the drivers registered with the operator of the system 100. The information relating to drivers includes personal data such as name, contact details (including phone number, home address), date of birth, next of kin and driver account data. Driver status information may be stored to indicate whether a driver is active or inactive, whether the driver has been allocated a vehicle etc. Each driver may also be assigned an individual and unique identifier as a means of identifying the driver. Callsigns may also be used to denote drivers and are stored in the driver network database 131, although callsigns can be changed and reallocated between drivers as long as the same callsign is not in use by two drivers at the same time.

Driver account data includes an account number. Other information may include a driver's insurance details, a driver's length of service in the fleet, details of parking fines, historical wage information, holiday leave, driver diary information, information regarding payment collections from drivers, driver's license number, national insurance (social security) number, details relating to a driver's taxicab license (such as Public Carriage Office (PCO) license), driver banking details (account number, sort code etc.). Miscellaneous information such as details of any allergies, smoker/non-smoker etc. may also be stored in the driver network database 131. Information regarding driver equipment such as a serial number of the driver's device 110 allocated to the driver, and mobile phone number of their driver's device 110 and their private mobile phone may also be recorded. Statistical information such as date of last job or historical earnings data may be recorded in the driver network database 131, or this may be recorded in the historical database 132.

Information relating to payments to and from drivers may be stored in the driver network database 131. Payments to the driver include a driver's wages. Driver outgoings may include, for example, car wash charges, insurance premiums, PCO renewal fee, accident costs, vehicle rental. To assist in maintaining this information, a purchase ledger number and contract number relating to each driver may be stored.

Each driver has an associated driver's device 110, three of which are shown at 110A, 110B and 110C in FIG. 5a and FIG. 5b. The driver's devices 110 are portable electronic devices that are provided with wireless communication facilities. The driver's devices 110 may take any suitable form, but typically are smart phones or personal digital assistants or such like. The driver's devices no include a display and one or more input devices such as a keyboard, a voice control module or a touch screen or any combination thereof.

The driver's devices 110 are connected to the driver's devices server 107 via radio network 111, which may for instance be a mobile phone (cellular phone) network. In this case, the driver's devices 110 are provided with subscriptions to the mobile phone network such that they can send digital data to and from the driver's devices server 107. Additionally, messages are able to be passed between the driver's devices no and the driver's devices server 107 through other media, and in particular SMS (short message service) messages and optionally also MMS (multimedia message service) messages.

The radio network 111 may alternatively be a dedicated radio network, for instance a private mobile phone network or a private radio network of some other type.

Data may be communicated between the driver's devices 110 and driver's devices server 107 over any suitable communications link, for instance using a data channel of a cellular telephone network such as a GSM, EDGE, GPRS, UMTS, HSxPA or LTE network.

The driver's devices 110 are configured to report their locations to the driver network database 131 at regular intervals, for instance 30 second intervals. The driver's devices 110 include GPS (global positioning system) receivers, which calculate the locations of the driver's devices 110 under control of the software applications executing on the driver's devices 110. Alternatively, they may include some other positioning module or device that is operable to calculate the positions of the driver's devices 110 with a suitable level of accuracy and resolution.

A private hire vehicle may be booked by a customer in one of three ways. Firstly, a private hire vehicle may be booked in a telephone conversation with a call centre operator. In this case, the customer initiates a telephone call with a call centre, an agent of which operates one of the call centre computer terminals 104A and 104B. The call centre agent then operates the terminal 104A, 104B so as to make the booking of the private hire vehicle according to the customer's requirements. The customer's requirements are obtained verbally during the telephone conversation between the customer and the agent.

In the second option, the customer may make the private hire vehicle booking using a browser application on a computing device 113, three examples of which are shown at 113A, 113B and 113C in FIG. 5a and FIG. 5b. Each of the computing devices 113 is connected to the web booking server 102 by a network 114, which may for instance be the Internet or another public or private network. The web booking server 102 includes web server functionality that causes display of suitable web pages by the browser of the terminal 113. The customer's requirements with respect to the private hire vehicle booking are obtained by the web booking server 102 through the provision of suitable pages to the computer terminal 113 requesting the provision of the required information by the customer. The information may be provided by the customer through free text entry through the use of drop down lists, radio buttons etc. Some information may be pre-filled into the web pages provided by the web booking server 102.

Booking through the web booking server 102 may require the customer to login to a web portal before they can make their booking. The logging in may require the entering of a username and a password or PIN number. Through the control of a web session by the web booking server 102, for instance using cookies provided to the computer terminals 113, the booking can be known to have been validly made by virtue of the customer having being logged in to the web booking server at the time the booking was made.

The final way in which a customer can make a booking of a private hire vehicle is using a dedicated software application that is installed on and running on a portable communications device 112, three of which are shown at 112A, 112B and 112C in FIGS. 5*a* and 5*b*. The portable communications devices 112 may take any suitable form, but typically are smart phones, feature phones, tablet computers or personal digital assistants or such like. The communication devices 112 are coupled to the application booking server 103 by a radio network 111, which may be the same as the radio network 111 described above with relation to the driver's devices 110 and the driver's devices 107.

The application is configured to provide a user interface that allows the customer to provide the software application with the information required to make the private hire vehicle booking. For instance, the software application, when executed, may cause the display of interactive pages that allow the customer to select or enter the required information. The software application is configured also to communicate the information relating to the booking that has been provided by the customer to the application booking server 103. If based on information provided by the customer it is determined that the application booking server 103 requires additional information, the software application running the mobile device 112 is configured to provide an interactive display to the customer such that the customer can provide the information, following which the software application causes it to be provided to the application booking server 103.

The customer may be required to log in to the software application on the mobile device 112, prior to making a booking. Logging in to the software application may require a username and a password or PIN number. Alternatively, the username may be entered during set up of the application and may not need to be entered subsequently when this software application is executed. If the username is not required to be entered, the user may log in to the software application simply by entering the password or PIN number.

The information about the private hire vehicle booking that is obtained during the booking process is as follows.

Customer details. The customer details may be the name of the customer or an identifier that uniquely identifies the customer within the operational database 130.

Service type. This indicates the category of vehicle. For instance, the service type may indicate a vehicle of a standard type and having four seats, or a vehicle of a standard type and having seven seats. The service may alternatively indicate a VIP vehicle, or an environmentally-friendly (electric or hybrid) vehicle (also known as a green vehicle).

Journey type. The journey type may be a single (one-way) trip, or it may be a wait and return trip. The journey type may alternatively be a journey including multiple pickup locations or multiple drop-off locations or both multiple pickup and multiple drop-off locations. The journey type may alternatively indicate that it is a pickup from an airport or a drop at an airport.

Pickup address. This indicates an address at which the customer is to be picked up at the beginning of the journey. The address is a natural language address. The address is selected from one of the plurality of addresses stored in a database. The addresses may be stored in the operational database 130 or the historical database 132, or they may be provided by an external address database service, for instance geo.me or qas.co.uk. The addresses each have associated therewith a verified coordinate location expressed in latitude and longitude. Multiple databases may be used (in a hierarchical fashion) for address lookup. The pickup address may be selected by the customer in any suitable way, with the most appropriate way depending on whether the customer is using the software application on their mobile device, using the web booking service or using an agent in a call centre. If the journey type is an airport pickup type, the pickup address indicates the airport and terminal and optionally flight number.

Drop-off address. The drop-off address again is selected from one of multiple addresses stored in the database and is selected by the customer in any suitable way. If the journey type is an airport drop-off type, the pickup address indicates the airport and terminal and optionally flight number.

Pickup date and time. This indicates a time and date which the customer requires the journey to start. Alternatively, the date and time may indicate ASAP (as soon as possible), if the customer requires the private hire vehicle at the earliest opportunity.

Optional information regarding the booking includes the following.

Customer's reference. This can be provided for instance as free text or selected from a drop-down menu. If a reference is provided, this information can be included in an account statement against a journey at a later date.

Additional comments. This is free text that provides any potentially relevant information, and may be provided to the driver once the booking has been allocated.

The system 100 comprises a journey cost calculation module 122. The cost calculation module 122 executes software code which determines the price for a requested journey, during the booking process and prior to vehicle allocation. Journey cost calculation is performed at the time of a booking and the result returned to the customer requesting the booking. The resulting cost for the journey is provided before the customer confirms the booking.

The journey cost calculation module 122 uses a number of different ways of calculating the base cost of the journey. The module 122 may set a fixed price for some journeys. These are agreed in advance with a particular account customer for journeys between pre-determined points. The journey cost calculation module 122 checks whether the booked journey and customer meet the requirements for a fixed price tariff. If the conditions are not met, then another pricing method is used. The journey cost calculation module 122 may use zonal pricing if a fixed price is not used. Where every point on the journey is within a defined zone, zonal pricing can be used. If neither fixed pricing nor zonal pricing is used, or if the conditions for their application are not met, then the journey cost calculation module 122 may use an A to B (A-B) pricing method. The A-B method may specify the number of units between points A and B. A unit price depending on the type of vehicle etc. is then used to calculate the price. If there is no A-B record for a particular journey, the crow fly (direct) distance (i.e. the length of a straight line between the pickup and drop-off locations) is used to calculate the base cost for the journey. This method may use map grid references or alternatively may be based on GPS data, i.e. the latitude and longitude of the pickup and drop-off points.

The journey cost calculation module 122 may retrieve all the map and location information needed to make these calculations from the historical database 132. The historical database 132 may store a detailed geospatial model of a particular region, such as a city. As an alternative, or in addition to the methods described above, the journey cost calculation module 122 may use the real road distance for the journey, which is calculated using the road map from the historical database 132 and a route planning algorithm. Different rates may be used for different parts of a single journey. For example a first per mile rate may be used for the first 10 miles of a journey and a second per mile rate may be used for the rest of the journey. The historical database 132 may also store information regarding speed limits and historical traffic data. This information may also be used by the journey cost calculation module 122 to calculate an estimated time for the journey. The estimated journey time may then form the basis of the cost calculation.

Other criteria used by the journey cost calculation module 122 when calculating the price are the type of vehicle (VIP, green, 7-seater etc.) including any special facilities the vehicle has, the method of payment and the date and time of the journey. The cost calculation module 122 may also apply a flat "pickup fee" for every journey.

The journey cost calculation module 122 may also determine how much of the fare charged to the customer is passed to the driver. This may be a simple percentage of the total fare or a more complex calculation based on one or more of journey time, distance, waiting time and number of passengers.

Various examples of allocating vehicle resources to vehicle requirements, including advance vehicle requests and other future vehicle requirements, are described in this disclosure. According to the example private hire booking service context, the allocation function allocates a vehicle and driver to a booking. The allocation function is described in some detail below. In brief, a vehicle and driver are allocated to the booking, and the associated customer, having regard to a number of factors including the pickup location specified in the booking, the drop-off location specified in the booking, the service type specified in the booking, the date and time specified in the booking, the geographical distribution of the vehicles that are managed by the system 100, the demand for vehicles that are managed by the system 100 and information relating to the drivers.

The allocation function is automatic insofar as it does not require any manual involvement once the booking has been made. Once a job has been allocated to a particular driver and a particular vehicle, this is recorded in the operational database 130 with an indication that the journey has not yet been traveled.

The vehicle and driver management function includes a number of features. These include the monitoring of vehicle in terms of distance traveled etc. and ensuring that they provided for mechanical servicing at appropriate times. Drivers are managed also to ensure that documentation relating to private hire vehicle licenses, insurance etc. is in place. Additionally, the function maintains a record of hours worked and jobs performed, along with any other relevant information.

The accounts management function acts to manage information relating to customer's accounts with the operator of the system 100. This includes the maintenance and management of information such as authorised users, credit limits, invoicing requirement etc.

The record keeping function acts to store various information that is created by or observed by the system 100. This information includes information about bookings yet to be fulfilled, which is included in the operational database 130.

Instead of the database functions being provided by a small number of databases, in the above embodiments the operational database 130 and the driver network database 131, as well as the historical database 132 (as shown in FIG. 5*a*), the functions may be split between a higher number of databases, as shown in the system 100 of FIG. 5*b*. Reference numerals are retained from FIG. 5*a* for like elements, and these elements are not described again here to avoid repetition.

In the FIG. 5*b* system, an accounts database 119 is configured to store the detail of every account held with the operator of the system 100. The record keeping function is provided primarily by a journeys travelled database 108 and a map and locations database 109, as well as other components of the system 100. Each vehicle has a respective record in a vehicle database 121. Each driver has a record in a driver database 120. Pickup and drop-off addresses are selected from one of the plurality of addresses stored in an address database 115. Once a job has been allocated to a particular driver and a particular vehicle, this is recorded in the journeys traveled database 108 along with an indication that the journey has not yet been traveled.

An example sequence of steps that may be performed by a system (e.g., system 100) during execution of an example booking job will now be described with reference to FIG. 6. This shows execution of a relatively simple job in which there is one pickup location, one drop-off location, no driver reallocation and no variation in the journey. Additionally, journey costing and invoicing are not covered by FIG. 6.

The operation starts at step 601. At step 602, a booking is accepted by the system 100. Alternative ways for accepting a booking or other type of vehicle request are described above with reference to FIG. 1, FIG. 5*a*, and FIG. 5*b*.

At step 603, the booking is confirmed to the customer, for instance by email. The message sent to the customer by the system 100 includes a booking reference number and some or all of the information relating to the booking, including the pickup and drop-off locations, the date and time of pickup etc.

At step 604, the system 100 saves the booking until it is time to start allocation. For an ASAP job, allocation may commence straight away. Otherwise, allocation may start a fixed time before the date and time specified for pickup in the booking information, as is described in more detail below.

At step 605, the system allocates a driver and a vehicle to the job. Some examples of allocating a vehicle are discussed in relation to FIG. 3 and FIG. 4. On allocating the vehicle, the status of the vehicle and driver is changed from "Available" to "Allocated". This prevents the vehicle/driver being allocated to a different job until the status changes to a suitable status.

At step 606, the system 100 sends a message to the customer with details of the allocated vehicle. The message includes text such as 'Your vehicle is on its way'. The message also indicates the job number, which may be the same as the booking number. The message also indicates the identity of the vehicle, so that it can be readily identified by the customer. The identity of the vehicle may be indicated for instance by the registration or license plate that is provided on the vehicle. It may also indicate the make and model of the vehicle, and/or the colour of the vehicle. Additionally, the message includes information by which the customer can contact the driver that has been allocated to the job. For instance, it may include the mobile telephone number of the driver. Providing the mobile telephone number of the driver allows the customer to call the driver with any comments or questions that they may have before the customer is collected by the vehicle. Additionally, the message includes a hyperlink to a webpage at which the location of the vehicle is shown on a map. This allows the customer to identify where the vehicle is at any stage between the vehicle being allocated to the job and the customer being collected by the vehicle.

At step 607, the system 100 sends a message to the driver with details of the job. The message includes various pieces of information including the name of the customer. This allows the driver to confirm the customer when the driver meets the customer at the pickup location. The message also includes the pickup location and the drop-off location. The pickup location and drop-off location may be provided in the message in such a way that they can be extracted by the driver's device no and automatically placed into a navigation application that is present on the driver's device 110. This allows the driver to commence the provision by the driver's device 110 of navigation guidance to the pickup location in response to the driver selecting the pickup location by way of an input on the driver's device 110. Similarly, after the customer has been collected at the pickup location, the driver can cause the device 110 to commence providing route guidance to the drop-off location by providing a suitable input on the driver's device 110.

The system 100 may comprise a route planning module configured to run a route planning algorithm. The route planning module may access the map and location database 109 in order to calculate a route. The route planning module may also access historical traffic data in the historical database 132 and/or live traffic information in order to more accurately predict the fastest route. Once a driver has indicated that they have picked up a customer, the route planning module may provide route guidance to the driver via the driver's device 110. The route guidance may be in the form of navigation instructions. Having a centralised route planning and guidance providing system avoids the need for the driver to provide their own route guidance device and to keep such a device updated.

At step 608, the system 100 receives a POB (passenger on board) message from the driver. This message is transmitted by the driver's device 110 in response to the driver indicating that they have collected the customer from the pickup location. The option to indicate POB status is provided to the driver once the driver device 110 determines that the vehicle has arrived at the pickup location, or is within a predetermined radius (e.g. 50 m) of the pickup location and has become stationary. However, the sending of the POB message from the driver's device 110 is not automatic. In this step, the status of the vehicle/driver is changed from "Allocated" to "POB".

Following receiving the POB message from the driver, the system 100 at step 609 records that the customer has been picked up. Next, the system 100 receives a drop-off message from the driver at step 610. This is message is sent by the device 110 after the driver indicates to the driver's device 110 that the customer has been deposited at the drop-off location. The option to indicate that the customer has been dropped off may be provided to the driver upon the driver's device 110 determining that the vehicle has reached the drop-off location or is within a predetermined radius (e.g. 50 m) of the drop-off location and has become stationary. However, the sending of the drop-off message from the driver's device 110 is not automatic.

After the drop-off message has been received from the driver's device 110 at step 611, the system 100 completes a journey record for the journey in the operational database 130 (the record was created during the booking process). The record of the journey stored in the operational database 130 includes the following information. The record includes the pickup address and the drop-off address. The information also includes the pickup time and date and, if different, the booking time and date. The record also includes the drop-off time and date, as detected by the system 100 in response to receiving the drop-off message from the driver at step 610. The record also includes the cost of the journey, in terms of financial value.

The record also includes the traveled distance, which is not the crow fly (direct) distance between the pickup and drop-off locations but instead is the road distance traveled by the vehicle. The record also includes the journey time, in terms of minutes and seconds. The record also includes vehicle type information that indicates the type of vehicle that performs the journey.

The record also includes the booking information relating to the journey, which may include information about the identity of the customer that made the booking, the time of making the booking, the mode of making the booking (e.g. web, application or call centre) and any other relevant information relating to the booking.

Next, at step 612 the driver and vehicle are reallocated to the pool of available drivers. This is achieved by changing the status of the vehicle/driver to "Available" from "POB".

The customer is then messaged with a receipt for the journey traveled, if required, at step 613. Lastly, the operation ends at step 614.

In some embodiments, the vehicle resources are autonomous vehicles, also known as driverless vehicles or driverless cars. Where the system 100 comprises autonomous vehicles, each driver device 110 is replaced with an on-board control system, which can be termed an autonomous mode controller. The autonomous mode controller controls the speed and direction of the autonomous vehicle and maintains an accurate record of the autonomous (unmanned) vehicle's location and orientation. Autonomous driving sensors may include any number of devices configured to generate signals that help navigate the vehicle while the vehicle is operating in an autonomous (e.g., driverless) mode. The autonomous vehicle may comprise a number of cameras and other sensors, including LIDAR and/or radar sensors, which feed information about the vehicle's surroundings to the autonomous mode controller. The information includes the position, constitution, orientation and velocity of nearby objects, including other vehicles. The autonomous driving sensors help the vehicle "see" the roadway and the vehicle surroundings and/or negotiate various obstacles while the vehicle is operating in the autonomous mode. The autonomous mode controller may communicate with the core system 101 via the radio network 111 using any suitable protocol.

The autonomous mode controller may be configured to control one or more subsystems while the vehicle is operating in the autonomous mode. Examples of subsystems that may be controlled by the autonomous mode controller may include a brake subsystem, a suspension subsystem, a steering subsystem, and a powertrain subsystem. The autonomous mode controller may control any one or more of these subsystems by outputting signals to control units associated with these subsystems. The autonomous mode controller may control the subsystems based, at least in part, on signals generated by the autonomous driving sensors.

The autonomous vehicles may have on-board route planning modules as part of the autonomous mode controller. Upon the autonomous vehicle receiving information representing a start and end location for a route, the on-board route planning module accesses the map and location database 109 and optionally traffic data in the historical database 132 and/or live traffic information to calculate a best route. The autonomous vehicle may also be given information representing one or more waypoints to travel to between the start and end locations, or a number of waypoints or locations which can be traveled to in any order. The route planning module may then calculate the most efficient route to take to visit each of the locations.

Alternatively, the autonomous vehicle may not have an on-board route planning module and may instead receive route information, i.e. information specifying one or more routes, or navigation instructions from the core system 101.

The autonomous mode controller of each autonomous vehicle may also be pre-programmed to cause the autonomous vehicle to travel to and wait at a particular location when the vehicle does not have particular start and end points or waypoints to travel to. Alternatively, when the autonomous vehicle is not undertaking a specific journey (i.e. when it is idle), the autonomous mode controller may cause the autonomous vehicle to adhere to one of a number of predetermined circuits or routes. The particular predetermined circuit or route chosen by the autonomous mode controller may depend on the location of the vehicle when it becomes idle.

Figure 7:
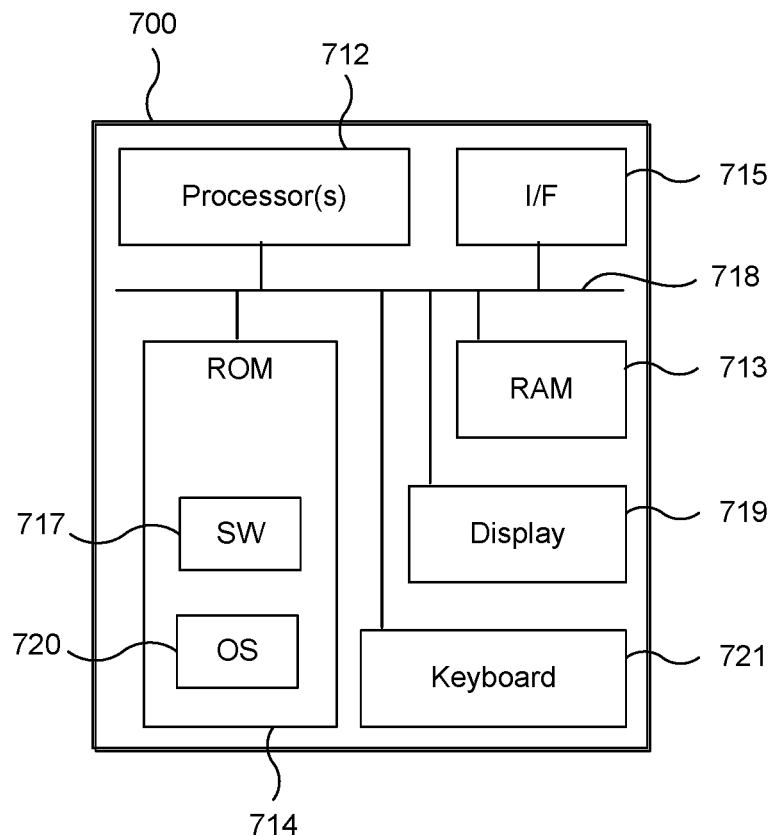
FIG. 7 is a schematic diagram illustrating components of a server in accordance with various embodiments of the present invention.

As discussed with respect to various embodiments in this disclosure, a vehicle resource allocation system (e.g., the system 10, the system 100) may comprise one or more servers. Whether a system for a particular embodiment includes one or multiple servers, each server preferably includes a number of features as will now be described with reference to FIG. 7. FIG. 7 shows one server 700. If a system (e.g., the system 10, the system 100) comprises plural servers, multiple versions of the FIG. 7 server 700 may be connected together.

Each server 700 includes a processor 712. The processor 712 is connected to volatile memory such as RAM 713 by a bus 718. The bus 718 also connects the processor 112 and the RAM 713 to non-volatile memory, such as ROM 714. A communications interface 715 is coupled to the bus 718, and thus also to the processor 712 and the memories 713, 714. The interface 715 is connected to a communications network (e.g., a radio network) in any suitable way, for instance via the Internet or a local network. Within the ROM 714 is stored a software application 717, which includes program code that causes the server to perform the functions required of it. An operating system (OS) 720 also is stored in the ROM 714.

An output device such as a display 719 may be provided with the server 700. An input device such as a keyboard 721 may be provided with the server 700. This allows configuration, monitoring and updating by administrators and other users as required.

The server 700 may take any suitable form. Generally speaking, the server 700 comprises processing circuitry 712, including one or more processors, and a storage device 714, 713, comprising a single memory unit or a plurality of memory units. The storage device 714, 713 stores computer program instructions that, when loaded into the processing circuitry 712, control the operation of the server 700.

The term 'memory' when used in this specification is intended to relate primarily to memory comprising both non-volatile memory and volatile memory unless the context implies otherwise, although the term may also cover one or more volatile memories only, one or more non-volatile memories only, or one or more volatile memories and one or more non-volatile memories. Examples of volatile memory include RAM, DRAM, SDRAM etc. Examples of non-volatile memory include ROM, PROM, EEPROM, flash memory, optical storage, magnetic storage, etc.

Reference to "computer-readable storage medium", "computer program product", "tangibly embodied computer program" etc., or a "processor" or "processing circuit" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

It should be realised that the foregoing embodiments are not to be construed as limiting and that other variations and modifications will be evident to those skilled in the art and are intended to be encompassed by the claims unless expressly excluded by the claim language when taking into account equivalents. Some such alternatives and modifications will now be described.

In the above, journey cost calculation is performed at the time of a booking and the result returned to the customer requesting the booking. Cost calculation may alternatively be performed ahead of the booking being made (for instance on the basis of an agreed tariff), at the end of fulfillment of the booking, or at a later time.

Additionally, the cost scoring of a vehicle against a booking may be performed in any suitable way. Also, cost scoring may be performed only once and the best vehicle allocated at that time, rather than cost scoring being performed until it is decided to allocate a vehicle.

Instead of selecting vehicles for the candidate pool of vehicles based solely on crow fly distance, vehicles may be selected based on zoning of their current location. For instance, in respect of a pickup location in a certain zone, all vehicles that are currently located in the same zone or a zone that borders that zone may be selected for inclusion in the pool of candidate vehicles. If zone information is stored in the map and location database 109 (or another database) as part of the current location information for vehicles, using zone information in the selection of candidate vehicles may be particularly computationally non-intensive. The use of zones also allows barriers (such as rivers) between geographically proximate areas to be taken into account when classifying whether or not zones are adjacent.

Instead of calculating the allocation buffer value only for the best scoring vehicle, the allocation buffer value may instead be calculated for the 2, 3 or 4 best scoring vehicles.

Although this can increase the number of allocation buffer values that need to be performed, it may increase the likelihood that the allocated vehicle will arrive at the pickup location prior to the booking start time or at the booking start time.

Instead of waiting until a predetermined number of minutes before the booking start time before commencing allocation, the number of minutes may for instance be a function of the number of bookings with start times in a certain period, the number of 'available' vehicles in the fleet and/or the density of 'available' vehicles in the area of the pickup location.

Moreover, the disclosure of the present application should be understood to include any novel features or any novel combination of features either explicitly or implicitly disclosed herein or in any generalisation thereof and during prosecution of the present application or of any application derived therefrom, new claims may be formulated to cover any such features and/or combination of such features.

What is claimed is:

1. A system for allocating networked vehicle resources to vehicle requirements, the system comprising:
    a vehicle resource allocation module configured to receive vehicle requests from a plurality of requester devices;
    a vehicle resource location monitoring module in communication with and configured to monitor respective current locations for a plurality of vehicle resources, each vehicle resource being associated with a respective vehicle location, wherein each vehicle resource is associated with a respective vehicle resource device comprising a positioning component that is configured to determine a respective current location of the vehicle resource;
    at least one processor in communication with the vehicle resource allocation module and with the vehicle resource location monitoring module; and
    a computer-readable medium in communication with the at least one processor, the computer-readable medium storing instructions that when executed by the at least one processor direct the at least one processor to:
        a) store, by the vehicle resource allocation module, plural vehicle requirements in the form of plural vehicle requests, each vehicle request including at least a respective start time and a respective start location, wherein for each vehicle requirement of the plural vehicle requirements the respective start time and the respective start location have been received from an associated one of the plurality of requester devices;
        b) for a first vehicle request of the plural vehicle requests,
            dynamically select, by the vehicle resource allocation module, a time-ahead value (X) representing a predetermined time ahead of the start time of the first vehicle request at which to begin an allocation process for the first vehicle request; and
            after dynamically selecting the time-ahead value (X), automatically determine, by the vehicle resource allocation module, that a difference between a current time and the start time of the first vehicle request is not greater than the time-ahead value (X);
        c) in response to the determining at step b):
            automatically detect, by the vehicle resource location monitoring module, a respective current location for each vehicle resource of the plurality of vehicle resources;
            automatically determine, by the vehicle resource allocation module, a respective direct distance from the respective current location of each vehicle resource of the plurality of vehicle resources, to the start location included in the first vehicle request; and
            after determining the respective direct distance to the start location for each vehicle resource, automatically select, by the vehicle resource allocation module, a predetermined number (Y) of vehicle resources based on the respective direct distances to the start location and based on respective vehicle resource statuses associated with the vehicle resources, and without calculating respective routes and travel distances to the start location for each vehicle resource, thereby forming a pool of (Y) plural candidate vehicle resources, each of said candidate vehicle resources being for possible fulfillment of the first vehicle request;
        d) for each said candidate vehicle resource in the pool of (Y) plural candidate vehicle resources, automatically calculate, by the vehicle resource allocation module, a respective score that is related to the suitability of the candidate vehicle resource to fulfil the first vehicle request, wherein the suitability is without regard to the respective journey time of each candidate vehicle resource to the start location;
        e) for each of only a number (Z) of the candidate vehicle resources in the pool of (Y) plural candidate vehicle resources selected by the vehicle resource allocation module based on their respective scores and a threshold score, automatically calculate, by the vehicle resource allocation module, a respective journey time from the candidate vehicle resource's associated vehicle location to the start location included in the first vehicle request, wherein (Z) is less than (Y);
        f) at a given time, automatically determine, by the vehicle resource allocation module, whether there is a need to allocate a vehicle resource to the first vehicle request, using both:
            1) the respective scores calculated for the (Z) candidate vehicle resources selected from the pool of (Y) plural candidate vehicle resources, and
            2) the calculated one or more respective journey times for the (Z) candidate vehicle resources,
            wherein automatically determining whether there is a need to allocate a vehicle resource to the first vehicle request comprises:
                determining that a respective score calculated for a candidate vehicle resource in step d) is better than respective scores calculated for all other candidate vehicle resources in the pool of (Y) plural candidate vehicle resources;
                determining, for the candidate vehicle resource having the best respective score, an allocation buffer value by performing one of the following:
                    multiplying the respective calculated journey time from that candidate vehicle resource's associated vehicle location to the start location by a predetermined factor,
                    determining a fixed time value, or
                    calculating a sum of a number of values, each value corresponding to a respective zone through which the candidate vehicle resource would need to travel to reach the start location;

determining, for the candidate vehicle resource having the best respective score, a sum of the allocation buffer value for that candidate vehicle resource and the respective calculated journey time from that candidate vehicle resource's associated vehicle location to the start location included in the first vehicle request; and determining whether the sum of the allocation buffer value and the respective calculated journey time meets a predetermined relationship with respect to a time remaining from the current time to the start time of the first vehicle request;

g) automatically repeat performance of steps d), e) and f) at at least two different times for the first vehicle request until it is determined at step f) that there is a need to allocate a vehicle resource to the first vehicle request;

h) on determining at step f) that there is a need to allocate a vehicle resource to the first vehicle request, automatically select a vehicle resource of the (Z) candidate vehicle resources to allocate to the first vehicle request based on the respective scores calculated on last performance of step d); and i) in response to selecting the vehicle resource at h), automatically transmit a signal to a vehicle resource device associated with the selected vehicle resource, the signal indicating that the selected vehicle resource is to proceed to the start location included with the first vehicle request, to fulfill the first vehicle request.

2. The system of claim 1, wherein automatically detecting, by the vehicle resource location monitoring module, the respective current location for each vehicle resource of the plurality of vehicle resources, comprises:

receiving, by the vehicle resource location monitoring module, for each vehicle resource of the plurality of vehicle resources, an indication of the respective current location of the vehicle resource.

3. The system of claim 2, wherein receiving the indication of the respective current location of the vehicle resource comprises:

receiving the indication of the respective current location from the vehicle resource.

4. The system of claim 2, wherein receiving the indication of the respective current location associated with the vehicle resource comprises:

receiving the indication of the respective current location from a location service in communication with the vehicle resource.

5. The system of claim 1, wherein the first vehicle request comprises a request for a first responder vehicle.

6. The system of claim 1, wherein the first vehicle request comprises a customer booking for a private hire vehicle, and wherein the start location is a pickup location for the customer booking.

7. The system of claim 1, wherein the first vehicle request comprises a request to send a vehicle to a search location.

8. The system of claim 1, wherein the first vehicle request comprises a request for an autonomous vehicle.

9. The system of claim 1, wherein the instructions when executed by the at least one processor direct the at least one processor to perform automatically selecting a vehicle resource of the (Z) candidate vehicle resources to allocate to the first vehicle request at step h) by:

automatically selecting the vehicle resource having the best respective score calculated on the last performance of step d) to allocate to the first vehicle request.

10. The system of claim 1, wherein the respective vehicle location associated with the candidate vehicle resource comprises the current location of the candidate vehicle resource.

11. The system of claim 1, wherein the respective vehicle location associated with the candidate vehicle resource comprises a drop-off location of a customer booking that the candidate vehicle resource is currently fulfilling.

12. The system of claim 1, wherein the instructions when executed by the at least one processor to automatically calculate, by the vehicle resource allocation module, a respective journey time for each of only a number (Z) of the candidate vehicle resources, direct the at least one processor to:

choose, based on a respective vehicle resource status of a candidate vehicle resource, between:
1) calculating a respective journey time for the candidate vehicle resource from the candidate vehicle resource's vehicle location by calculating a journey time from the respective current location of the candidate vehicle resource to the start location included in the first vehicle request, and
2) calculating a respective journey time for the candidate vehicle resource from the candidate vehicle resource's associated vehicle location by calculating a journey time from a drop-off location of a customer booking that the candidate vehicle resource is currently fulfilling to the start location included in the first vehicle request.

13. The system of claim 1, wherein the instructions when executed by the at least one processor direct the at least one processor to automatically select, by the vehicle resource allocation module, the predetermined number (Y) of vehicle resources based on the respective direct distances to the start location and based on respective vehicle resource statuses associated with the vehicle resources, by:

rejecting one or more vehicles of a fleet that have a respective vehicle resource status indicating that the vehicle of the fleet is potentially not able to fulfil the first vehicle request.

14. The system of claim 1, wherein the instructions when executed by the at least one processor direct the at least one processor to automatically select, by the vehicle resource allocation module, the predetermined number (Y) of vehicle resources based on the respective direct distances to the start location and based on respective vehicle resource statuses associated with the vehicle resources, by:

selecting the predetermined number (Y) of vehicle resources that are geographically closest to the start location included in the first vehicle request based on the respective direct distances determined for the vehicle resources.

15. The system of claim 14, wherein the predetermined number (Y) is between 10 and 100.

16. The system of claim 1, wherein the instructions when executed by the at least one processor direct the at least one processor to perform step g) by:

performing steps c), d), e) and f) at least two times for the first vehicle request until it is determined at step f) that there is a need to allocate a vehicle resource to the first vehicle request.

17. The system of claim 1, wherein the instructions when executed by the at least one processor direct the at least one processor to automatically calculate, by the vehicle resource allocation module, a respective score that is related to the suitability of the candidate vehicle resource to fulfil the vehicle request by:
calculating sub scores for each of plural factors and performing a mathematical operation on the sub scores.

18. The system of claim 1, wherein the instructions when executed by the at least one processor direct the at least one processor to automatically calculate, by the vehicle resource allocation module, a respective journey time from the vehicle location associated with the candidate vehicle resource, to the start location included in the first vehicle request by:
using historical or current data about traffic delays on one or more routes between the respective current location of the candidate vehicle resource and the start location included in the first vehicle request.

19. The system of claim 1, wherein the pool of (Y) plural candidate vehicle resources comprises fewer than a total number of vehicle resources that are available to fulfil the first vehicle request.

20. A method for a vehicle resource allocation controller device to allocate networked vehicle resources to vehicle requirements, the method comprising:
a) storing, by a vehicle resource allocation controller device, plural vehicle requirements in the form of plural vehicle requests, each vehicle request including at least a respective start time and a respective start location,
wherein the vehicle resource allocation controller device is in communication with a plurality of requester devices and is configured to receive vehicle requests from the plurality of requester devices, and
wherein the vehicle resource allocation controller device is in communication with a vehicle resource location monitoring module that is in communication with and configured to monitor respective current locations for a plurality of vehicle resources, each vehicle resource being associated with a respective vehicle location, wherein each vehicle resource is associated with a respective vehicle resource device comprising a positioning component that is configured to determine a respective current location of the vehicle resource,
wherein for each vehicle requirement of the plural vehicle requirements the respective start time and the respective start location have been received from an associated one of the plurality of requester devices;
b) for a first vehicle request of the plural vehicle requests, dynamically selecting, by the vehicle resource allocation controller device, a time-ahead value N representing a predetermined time ahead of the start time of the first vehicle request at which to begin an allocation process for the first vehicle request; and
after dynamically selecting the time-ahead value (X), automatically determining, by the vehicle resource allocation controller device, that difference between a current time and the start time of the first vehicle request is not great than the time-ahead value (X);
c) in response to the determining at step b):
automatically detecting, using the vehicle resource location monitoring module, a respective current location for each vehicle resource of the plurality of vehicle resources;
automatically determining, by the vehicle resource allocation controller device, a respective direct distance from the respective current location of each vehicle resource of the plurality of vehicle resources, to the start location included in the first vehicle request; and
after determining the respective direct distance to the start location for each vehicle resource, automatically select, by the vehicle resource allocation module, a predetermined number (Y) of vehicle resources based on the respective direct distances to the start location and based on respective associated vehicle resource statuses, and without calculating respective routes and travel distances to the start location for each vehicle resource, thereby forming, by the vehicle resource allocation controller device, a pool of (Y) plural candidate vehicle resources, each of said candidate vehicle resources being for possible fulfillment of the first vehicle request;
d) for each said candidate vehicle resource in the pool of (Y) plural candidate vehicle resources, automatically calculating, by the vehicle resource allocation controller device, a respective score that is related to the suitability of the candidate vehicle resource to fulfil the first vehicle request, wherein the suitability is without regard to the respective journey time of each candidate vehicle resource to the start location;
e) for each of only a number (Z) of the candidate vehicle resources in the pool of (Y) plural candidate vehicle resources selected by the vehicle resource allocation module based on their respective scores and a threshold score, automatically calculating, by the vehicle resource allocation controller device, a respective journey time from the candidate vehicle resource's associated vehicle location to the start location included in the first vehicle request, wherein (Z) is less than (Y);
f) at a given time, automatically determining, by the vehicle resource allocation controller device, whether there is a need to allocate a vehicle resource to the first vehicle request, using both:
1) the respective scores calculated for the (Z) candidate vehicle resources of the pool of (Y) plural candidate vehicle resources, and
2) the calculated one or more respective journey times for the (Z) candidate vehicle resources,
wherein determining whether there is a need to allocate a vehicle resource to the first vehicle request comprises:
determining that a respective score calculated for a candidate vehicle resource in step d) is better than respective scores calculated for all other candidate vehicle resources in the pool of (Y) plural candidate vehicle resources;
determining, for the candidate vehicle resource having the best respective score, an allocation buffer value by performing one of the following:
multiplying the respective calculated journey time from that candidate vehicle resource's associated vehicle location to the start location by a predetermined factor;
determining a fixed time value, or
calculating a sum of a number of values, each value corresponding to a respective zone through which the candidate vehicle resource would need to travel to reach the start location:
determining, for the candidate vehicle resource having the best respective score, a sum of the allocation buffer value for that candidate vehicle resource and the respective calculated journey time from that candidate vehicle resource's associated vehicle location to the start location included in the first vehicle request; and
determining whether the sum of the allocation buffer value and the respective calculated journey time meets a predetermined relationship with respect to a time remaining from the current time to the start time of the first vehicle request;
g) automatically repeat performance, by the vehicle resource allocation controller device, of steps d), e) and f) at at least two different times for the first vehicle request until it is determined at step f) that there is a need to allocate a vehicle resource to the first vehicle request;
h) on determining at step f) that there is a need to allocate a vehicle resource to the first vehicle request, automatically select, by the vehicle resource allocation controller device, a vehicle resource of the (Z) candidate vehicle resources to allocate to the first vehicle request based on the respective scores calculated on last performance of step d); and
i) in response to selecting the vehicle resource at h), automatically transmit a signal to a vehicle resource device associated with the selected vehicle resource, the signal indicating that the selected vehicle resource is to proceed to the start location included with the first vehicle request, to fulfill the first vehicle request.

21. An apparatus for allocating networked vehicle resources to vehicle requirements, the apparatus comprising:
a processor in communication with:
a plurality of requester devices, and
a plurality of vehicle resources, each vehicle resource being associated with a respective vehicle location, wherein each vehicle resource is associated with a respective vehicle resource device comprising a positioning component that is configured to determine a respective current location of the vehicle resource;
a computer-readable medium in communication with the processor, the computer-readable medium storing instructions that when executed by the processor direct the processor to:
a) receive and store plural vehicle requirements in the form of plural vehicle requests, each vehicle request including at least a respective start time and a respective start location, wherein for each vehicle requirement of the plural vehicle requirements the respective start time and the respective start location have been received from an associated one of the plurality of requester devices;
b) for a first vehicle request of the plural vehicle requests,
dynamically select a time-ahead value (X) representing a predetermined time ahead of the start time of the first vehicle request at which to begin an allocation process for the first vehicle request; and
after dynamically selecting the time-ahead value (X), automatically determine that a difference between a current time and the start time of the first vehicle request is not greater than the time-ahead value (X);
c) in response to the determining at step b):
automatically detect, by the vehicle resource location monitoring module, a respective current location for each vehicle resource of the plurality of vehicle resources;
automatically determine a respective direct distance from the respective current location of each vehicle resource of the plurality of vehicle resources, to the start location included in the first vehicle request; and
after determining the respective direct distance to the start location for each vehicle resource, automatically select a predetermined number (Y) of vehicle resources based on the respective direct distances to the start location and based on respective vehicle resource statuses associated with the vehicle resources, and without calculating respective routes and travel distances to the start location for each vehicle resource, thereby forming a pool of (Y) plural candidate vehicle resources, each of said candidate vehicle resources being for possible fulfillment of the first vehicle request;
d) for each candidate vehicle resource in the pool of (Y) plural candidate vehicle resources, automatically calculate a respective score that is related to the suitability of the candidate vehicle resource to fulfil the first vehicle request, wherein the suitability is without regard to the respective journey time of each candidate vehicle resource to the start location;
e) for each of only a number (Z) of the candidate vehicle resources in the pool of (Y) plural candidate vehicle resources selected based on their respective scores and a threshold score, automatically calculate a respective journey time from the candidate vehicle resource's associated vehicle location to the start location included in the first vehicle request, wherein (Z) is less than (Y);
f) at a given time, automatically determine whether there is a need to allocate a vehicle resource to the first vehicle request, using both:
1) the respective scores calculated for the (Z) candidate vehicle resources of the pool of (Y) plural candidate vehicle resources, and
2) the calculated one or more respective journey times for the (Z) candidate vehicle resources,
wherein determining whether there is a need to allocate a vehicle resource to the first vehicle request comprises:
determining that a respective score calculated for a candidate vehicle resource in step d) is better than respective scores calculated for all other candidate vehicle resources in the pool of (Y) plural candidate vehicle resources;
determining, for the candidate vehicle resource having the best respective score, an allocation buffer value by performing one of the following:
multiplying the respective calculated journey time from that candidate vehicle resource's associated vehicle location to the start location by a predetermined factor,
determining a fixed time value, or
calculating a sum of a number of values, each value corresponding to a respective zone through which the candidate vehicle resource would need to travel to reach the start location;
determining, for the candidate vehicle resource having the best respective score, a sum of the allocation buffer value for that candidate vehicle resource and the respective calculated journey time from that candidate vehicle resource's associated vehicle location to the start location included in the first vehicle request; and determining whether the sum of the allocation buffer value and the respective calculated journey time meets a predetermined relationship with respect to a time remaining from the current time to the start time of the first vehicle request;

g) automatically repeat performance of steps d), e) and f) at at least two different times for the first vehicle request until it is determined at step f) that there is a need to allocate a vehicle resource to the first vehicle request;

h) on determining at step f) that there is a need to allocate a vehicle resource to the first vehicle request, automatically select a vehicle resource of the (Z) candidate vehicle resources to allocate to the first vehicle request based on the respective scores calculated on last performance of step d); and i) in response to selecting the vehicle resource at h), automatically transmit a signal to a vehicle resource device associated with the selected vehicle resource, the signal indicating that the selected vehicle resource is to proceed to the start location included with the first vehicle request, to fulfill the first vehicle request.

22. An apparatus for allocating networked vehicle resources to vehicle requirements, the apparatus comprising:

a processor; and a computer-readable medium in communication with the processor, the computer-readable medium storing instructions that when executed by the processor direct the processor to:

dynamically select a time-ahead value (X) representing a predetermined time ahead of a start time associated with a first vehicle request at which to begin an allocation process for the first vehicle request;

after dynamically selecting the time-ahead value (X), automatically determine that a difference between a current time and the start time associated with the first vehicle request is not greater than the time-ahead value (X);

in response to the determining that the difference between the current time and the start time associated with the first vehicle request is not greater than the time-ahead value (X), automatically detect a respective current location for each vehicle resource of the plurality of vehicle resources;

automatically determine a respective direct distance from the respective current location of each vehicle resource of the plurality of vehicle resources, to a start location associated with the first vehicle request; and after determining the respective direct distance to the start location for each vehicle resource, automatically select a predetermined number (Y) of vehicle resources based on the respective direct distances to the start location and based on respective vehicle resource statuses associated with the vehicle resources, and without calculating respective routes and travel distances to the start location for each vehicle resource, thereby forming a pool of (Y) plural candidate vehicle resources, each of said candidate vehicle resources being for possible fulfillment of the first vehicle request;

at a first given time, for each said candidate vehicle resource in the pool of (Y) plural candidate vehicle resources, calculate a respective first score that is related to the suitability of the candidate vehicle resource to fulfil the first vehicle request, wherein the suitability is without regard to the respective journey time of each candidate vehicle resource to the start location;

at the first given time, for each of only a number (Z) of the candidate vehicle resources in the pool of (Y) plural candidate vehicle resources selected based on their respective scores and a threshold score, automatically calculate a respective first journey time from a respective first vehicle location associated with the candidate vehicle resource to the start location associated with the first vehicle request;

at a second given time that is different from and after the first given time, for each candidate vehicle resource in the pool of (Y) plural candidate vehicle resources, calculate a respective second score that is related to the suitability of the candidate vehicle resource to fulfil the first vehicle request, wherein the suitability is without regard to the respective journey time of each candidate vehicle resource to the start location;

at the second given time, for each of only a number (Z) of the candidate vehicle resources in the pool of (Y) plural candidate vehicle resources, calculate a respective second journey time from a respective second vehicle location associated with the candidate vehicle resource to the start location associated with the first vehicle request;

upon making the determinations at the second given time, automatically determine that there is a need to allocate a vehicle resource to the first vehicle request, using both:

1) the respective second scores calculated for the (Z) candidate vehicle resources of the pool of (Y) plural candidate vehicle resources, and 2) the calculated one or more respective second journey times for the (Z) candidate vehicle resources, wherein automatically determining that there is a need to allocate a vehicle resource to the first vehicle request comprises:

determining that the respective second score calculated for a candidate vehicle resource is better than respective second scores calculated for all other candidate vehicle resources of the (Z) candidate vehicle resources;

determining, for the candidate vehicle resource having the best respective score, an allocation buffer value by performing one of the following:

multiplying the respective calculated journey time from that candidate vehicle resource's associated vehicle location to the start location by a predetermined factor, determining a fixed time value, or calculating a sum of a number of values, each value corresponding to a respective zone through which the candidate vehicle resource would need to travel to reach the start location;

determining, for the candidate vehicle resource having the best respective second score, a sum of the allocation buffer value for that candidate vehicle resource and the respective calculated second journey time from that candidate vehicle resource's associated second vehicle location to the start location included in the first vehicle request; and determining that the sum of the allocation buffer value and the respective calculated second journey time meets a predetermined relationship with respect to a time remaining from the current time to the start time of the first vehicle request;

after determining that there is a need to allocate a vehicle resource to the first vehicle request, automatically allocate to the first vehicle request the candidate vehicle resource of the (Z) candidate vehicle resources having the best respective second score; and in response to automatically allocating the vehicle resource, automatically transmit a signal to a vehicle resource device associated with the allocated vehicle resource, the signal indicating that the allocated vehicle resource is to proceed to the start location associated with the first vehicle request, to fulfill the first vehicle request.

23. The system of claim 1, wherein the instructions when executed by the at least one processor direct the at least one processor to dynamically select, by the vehicle resource allocation module, a time-ahead value (X) based on at least one of the following:
a priority associated with the first vehicle request, and
a density of vehicle resources of the plurality of vehicle resources within a geographical zone in which the start location is present, wherein the density is based on the respective current locations of the plurality of vehicle resources monitored by the vehicle resource location monitoring module.

24. The method of claim 20, wherein dynamically selecting, by the vehicle resource allocation controller device, a time-ahead value (X) based on at least one of the following:
a priority associated with the first vehicle request, and
a density of vehicle resources of the plurality of vehicle resources within a geographical zone in which the start location is present, wherein the density is based on the respective current locations of the plurality of vehicle resources.

25. The apparatus of claim 21, wherein the instructions when executed by the processor direct the processor to dynamically select a time-ahead value (X) based on at least one of the following:
a priority associated with the first vehicle request, and
a density of vehicle resources of the plurality of vehicle resources within a geographical zone in which the start location is present, wherein the density is based on the respective current locations of the plurality of vehicle resources.

26. The apparatus of claim 22, wherein the instructions when executed by the processor direct the processor to dynamically select a time-ahead value (X) based on at least one of the following:
a priority associated with the first vehicle request, and
a density of vehicle resources of the plurality of vehicle resources within a geographical zone in which the start location is present, wherein the density is based on the respective current locations of the plurality of vehicle resources.

* * * * *